(12) United States Patent
Jain et al.

(10) Patent No.: US 8,380,259 B2
(45) Date of Patent: *Feb. 19, 2013

(54) WIRELESSLY ACCESSING BROADBAND SERVICES USING INTELLIGENT COVERS

(75) Inventors: Deepak Jain, Garland, TX (US); Tuan Quoc Dao, Richardson, TX (US)

(73) Assignee: DeviceFidelity, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,690

(22) Filed: May 25, 2012

(65) Prior Publication Data

US 2012/0231766 A1  Sep. 13, 2012

Related U.S. Application Data

(63) Continuation of application No. 12/210,161, filed on Sep. 12, 2008, now Pat. No. 8,190,221.

(60) Provisional application No. 60/971,813, filed on Sep. 12, 2007.

(51) Int. Cl.
*H04M 1/00* (2006.01)

(52) U.S. Cl. ......... 455/575.1; 455/556.2; 455/90.3; 455/575.8

(58) Field of Classification Search ........... 455/575.1, 455/757.8, 556.1, 556.2, 575.8; 379/433.05, 379/437; 715/835
See application file for complete search history.

(56) References Cited

U.S. PATENT DOCUMENTS

| | | |
|---|---|---|
| 3,713,148 A | 1/1973 | Cardullo et al. |
| 4,614,861 A | 9/1986 | Pavlov et al. |
| 4,766,293 A | 8/1988 | Boston |
| 4,797,542 A | 1/1989 | Hara |
| 4,876,441 A | 10/1989 | Hara et al. |
| 5,140,517 A | 8/1992 | Nagata et al. |
| 5,180,902 A | 1/1993 | Schick et al. |
| 5,272,319 A | 12/1993 | Rey |
| 5,276,311 A | 1/1994 | Hennige |
| 5,434,398 A | 7/1995 | Goldberg |
| 5,528,222 A | 6/1996 | Moskowitz et al. |
| 5,729,607 A | 3/1998 | DeFries et al. |
| 5,748,737 A | 5/1998 | Daggar |
| 5,768,370 A | 6/1998 | Maatta et al. |

(Continued)

FOREIGN PATENT DOCUMENTS

| | | |
|---|---|---|
| CN | 1610918 | 4/2005 |
| DE | 103 17 394 | 11/2004 |

(Continued)

OTHER PUBLICATIONS

Onelook Dictionary Search; Definitions of firmware; Jul. 5, 2011; 2 pages.

(Continued)

*Primary Examiner* — Kamran Afshar
*Assistant Examiner* — Manpreet Matharu
(74) *Attorney, Agent, or Firm* — Fish & Richardson P.C.

(57) ABSTRACT

The present disclosure is directed to a system and method for wirelessly accessing broadband services using intelligent covers. In some implementations, a cover for a consumer device includes side surfaces, a rear surface, a physical interface, a circuit, and a broadband service card. The side surfaces and a rear surface form an opening that receives at least a portion of a consumer device. A first portion of at least one of the surfaces includes a connector for connecting to a port of the consumer device. The circuit connects the physical interface to the connector. The broadband service card connected to the physical interface and accesses a service foreign through the wireless broadband network independent of the consumer device.

24 Claims, 14 Drawing Sheets

U.S. PATENT DOCUMENTS

| | | |
|---|---|---|
| 5,801,661 A | 9/1998 | Suzuki |
| 5,834,747 A | 11/1998 | Cooper |
| 6,029,892 A | 2/2000 | Miyake |
| 6,032,859 A | 3/2000 | Muehlberger et al. |
| 6,041,305 A | 3/2000 | Sakurai |
| 6,045,043 A | 4/2000 | Bashan et al. |
| 6,073,840 A | 6/2000 | Marion |
| 6,073,856 A | 6/2000 | Takahashi |
| 6,078,806 A | 6/2000 | Heinonen et al. |
| 6,233,683 B1 | 5/2001 | Chan et al. |
| 6,308,890 B1 | 10/2001 | Cooper |
| 6,347,218 B1 | 2/2002 | Fuhrmann et al. |
| 6,407,914 B1 | 6/2002 | Helot |
| 6,418,326 B1 | 7/2002 | Heinonen et al. |
| 6,484,259 B1 | 11/2002 | Barlow |
| 6,533,178 B1 | 3/2003 | Gaul et al. |
| 6,625,425 B1 | 9/2003 | Hughes et al. |
| 6,634,564 B2 | 10/2003 | Kuramochi |
| 6,764,005 B2 | 7/2004 | Cooper |
| 6,771,981 B1 | 8/2004 | Zalewski et al. |
| 6,829,711 B1 | 12/2004 | Kwok et al. |
| 6,853,987 B1 | 2/2005 | Cook |
| 6,891,811 B1 | 5/2005 | Smith et al. |
| 6,920,338 B2 | 7/2005 | Engstrom et al. |
| 6,961,587 B1 | 11/2005 | Vilppula et al. |
| 6,970,130 B1 | 11/2005 | Walters et al. |
| 7,012,572 B1 | 3/2006 | Schaffner et al. |
| 7,079,832 B2 | 7/2006 | Zalewski et al. |
| 7,083,094 B2 | 8/2006 | Cooper |
| 7,113,139 B2 | 9/2006 | Charrat |
| 7,128,274 B2 | 10/2006 | Kelley et al. |
| 7,133,659 B2 | 11/2006 | Zalewski et al. |
| 7,147,165 B2 | 12/2006 | Mongin et al. |
| 7,155,199 B2 | 12/2006 | Zalewski et al. |
| 7,183,505 B2 | 2/2007 | Mongin et al. |
| 7,224,797 B2 | 5/2007 | Freeman et al. |
| 7,228,155 B2 | 6/2007 | Saunders |
| 7,232,061 B2 | 6/2007 | Furuyama et al. |
| 7,286,818 B2 | 10/2007 | Rosenberg |
| 7,290,716 B2 | 11/2007 | Ito |
| 7,305,260 B2 | 12/2007 | Vuori et al. |
| 7,334,732 B2 | 2/2008 | Cooper |
| 7,343,184 B2 | 3/2008 | Rostami |
| 7,364,092 B2 | 4/2008 | Narendra et al. |
| 7,395,975 B2 | 7/2008 | Ito |
| 7,407,094 B2 | 8/2008 | Myers et al. |
| 7,494,068 B2 | 2/2009 | Patrice |
| 7,509,487 B2 | 3/2009 | Lu et al. |
| 7,530,495 B2 | 5/2009 | Cooper |
| 7,537,169 B2 | 5/2009 | Gonzalez et al. |
| 7,575,177 B2 | 8/2009 | Killian et al. |
| 7,580,678 B2 | 8/2009 | Byman-Kivivuori et al. |
| 7,581,678 B2 | 9/2009 | Narendra et al. |
| 7,588,184 B2 | 9/2009 | Gandel et al. |
| 7,599,857 B2 | 10/2009 | Bishop et al. |
| 7,601,031 B2 | 10/2009 | Tanaka et al. |
| 7,604,176 B2 | 10/2009 | Bates et al. |
| 7,606,560 B2 | 10/2009 | Labrou et al. |
| 7,609,946 B2 | 10/2009 | Schedivy |
| 7,623,832 B2 | 11/2009 | Watanabe et al. |
| 7,657,255 B2 | 2/2010 | Abel et al. |
| 7,707,113 B1 | 4/2010 | DiMartino et al. |
| 7,719,613 B2 | 5/2010 | Kayanuma |
| 7,748,031 B2 | 6/2010 | Gonzalez et al. |
| 7,774,231 B2 | 8/2010 | Pond et al. |
| 7,789,313 B2 | 9/2010 | Degauque et al. |
| 7,805,615 B2 | 9/2010 | Narendra et al. |
| 7,821,399 B2 | 10/2010 | Otranen |
| 8,070,057 B2 | 12/2011 | Jain |
| 2001/0006902 A1 | 7/2001 | Ito |
| 2001/0054087 A1 | 12/2001 | Flom et al. |
| 2002/0017557 A1 | 2/2002 | Hendrick |
| 2002/0023215 A1 | 2/2002 | Wang et al. |
| 2002/0055368 A1 | 5/2002 | Lee |
| 2002/0065902 A1 | 5/2002 | Janik et al. |
| 2002/0128029 A1 | 9/2002 | Nishikawa et al. |
| 2003/0046365 A1 | 3/2003 | Pfister et al. |
| 2003/0052168 A1 | 3/2003 | Wong |
| 2003/0064689 A1 | 4/2003 | Engstrom et al. |
| 2003/0085288 A1 | 5/2003 | Luu |
| 2003/0100338 A1 | 5/2003 | Lee |
| 2003/0135463 A1 | 7/2003 | Brown et al. |
| 2003/0145205 A1 | 7/2003 | Sarcanin |
| 2003/0172028 A1 | 9/2003 | Abell et al. |
| 2003/0186729 A1 | 10/2003 | Engstrom et al. |
| 2003/0204845 A1 | 10/2003 | Sibley et al. |
| 2003/0224831 A1 | 12/2003 | Engstrom et al. |
| 2004/0064612 A1 | 4/2004 | Pinto et al. |
| 2004/0070952 A1 | 4/2004 | Higuchi et al. |
| 2004/0073519 A1 | 4/2004 | Fast |
| 2004/0083275 A1 | 4/2004 | Strisower |
| 2004/0097256 A1 | 5/2004 | Kujawski |
| 2004/0127256 A1 | 7/2004 | Goldthwaite et al. |
| 2004/0209648 A1 | 10/2004 | Chen |
| 2004/0220964 A1 | 11/2004 | Shiftan et al. |
| 2004/0238857 A1 | 12/2004 | Beroz et al. |
| 2004/0256469 A1 | 12/2004 | Faenza et al. |
| 2005/0022002 A1 | 1/2005 | Poisner |
| 2005/0023359 A1 | 2/2005 | Saunders |
| 2005/0027543 A1 | 2/2005 | Labrou et al. |
| 2005/0055549 A1 | 3/2005 | Fischer |
| 2005/0074123 A1 | 4/2005 | Cromer et al. |
| 2005/0090280 A1* | 4/2005 | Nielsen ..................... 455/550.1 |
| 2005/0114780 A1 | 5/2005 | Turgeman |
| 2005/0119936 A1 | 6/2005 | Buchanan et al. |
| 2005/0182710 A1 | 8/2005 | Andersson et al. |
| 2005/0182926 A1 | 8/2005 | Akashika et al. |
| 2005/0197169 A1 | 9/2005 | Son |
| 2005/0212690 A1 | 9/2005 | Nishikawa |
| 2005/0224589 A1 | 10/2005 | Park et al. |
| 2005/0269401 A1 | 12/2005 | Spitzer et al. |
| 2005/0269402 A1 | 12/2005 | Spitzer et al. |
| 2005/0286212 A1* | 12/2005 | Brignone et al. .............. 361/679 |
| 2006/0056397 A1 | 3/2006 | Aizu et al. |
| 2006/0074698 A1 | 4/2006 | Bishop et al. |
| 2006/0089123 A1* | 4/2006 | Frank ........................... 455/411 |
| 2006/0160560 A1* | 7/2006 | Josenhans et al. ......... 455/550.1 |
| 2006/0186209 A1 | 8/2006 | Narendra et al. |
| 2006/0219776 A1 | 10/2006 | Finn |
| 2006/0226217 A1 | 10/2006 | Narendra et al. |
| 2006/0231623 A1 | 10/2006 | Brown et al. |
| 2006/0287004 A1 | 12/2006 | Fuqua |
| 2006/0287964 A1 | 12/2006 | Brown |
| 2006/0291483 A1 | 12/2006 | Sela |
| 2007/0011724 A1 | 1/2007 | Gonzalez et al. |
| 2007/0014407 A1 | 1/2007 | Narendra et al. |
| 2007/0014408 A1 | 1/2007 | Narendra et al. |
| 2007/0016798 A1 | 1/2007 | Narendra et al. |
| 2007/0023532 A1 | 2/2007 | Narendra et al. |
| 2007/0053306 A1 | 3/2007 | Stevens |
| 2007/0057038 A1 | 3/2007 | Gannon |
| 2007/0099592 A1 | 5/2007 | Thome et al. |
| 2007/0113260 A1 | 5/2007 | Pua et al. |
| 2007/0145135 A1* | 6/2007 | Jogand-Coulomb et al. . 235/451 |
| 2007/0145152 A1 | 6/2007 | Jogand-Coulomb et al. |
| 2007/0152035 A1 | 7/2007 | Adams et al. |
| 2007/0155430 A1 | 7/2007 | Cheon et al. |
| 2007/0156436 A1 | 7/2007 | Fisher et al. |
| 2007/0156933 A1 | 7/2007 | Pinto et al. |
| 2007/0170256 A1 | 7/2007 | Breitfuss |
| 2007/0194105 A1 | 8/2007 | Kissick |
| 2007/0206743 A1 | 9/2007 | Chang |
| 2007/0253251 A1 | 11/2007 | Mizushima et al. |
| 2007/0254712 A1 | 11/2007 | Chitti |
| 2008/0003882 A1 | 1/2008 | Ni et al. |
| 2008/0010372 A1 | 1/2008 | Khedouri et al. |
| 2008/0026752 A1 | 1/2008 | Flore et al. |
| 2008/0051059 A1 | 2/2008 | Fisher |
| 2008/0051122 A1 | 2/2008 | Fisher |
| 2008/0052192 A1 | 2/2008 | Fisher |
| 2008/0052233 A1 | 2/2008 | Fisher et al. |
| 2008/0054079 A1 | 3/2008 | Mullen |
| 2008/0077950 A1 | 3/2008 | Burke et al. |
| 2008/0090527 A1 | 4/2008 | Atkinson et al. |
| 2008/0092212 A1 | 4/2008 | Patel et al. |
| 2008/0093467 A1 | 4/2008 | Narendra et al. |
| 2008/0099559 A1 | 5/2008 | Lo et al. |

| | | | |
|---|---|---|---|
| 2008/0144650 A1 | 6/2008 | Boch et al. | |
| 2008/0244208 A1 | 10/2008 | Narendra et al. | |
| 2008/0263363 A1 | 10/2008 | Jueneman et al. | |
| 2008/0263680 A1 | 10/2008 | Bertin | |
| 2008/0277484 A1 | 11/2008 | Launay et al. | |
| 2008/0279381 A1 | 11/2008 | Narendra et al. | |
| 2008/0290160 A1 | 11/2008 | Huot et al. | |
| 2008/0305772 A1 | 12/2008 | Balasubramanian et al. | |
| 2008/0308641 A1 | 12/2008 | Finn | |
| 2009/0002167 A1 | 1/2009 | Mosteller | |
| 2009/0006722 A1 | 1/2009 | McAvoy et al. | |
| 2009/0015198 A1 | 1/2009 | Brandenburg | |
| 2009/0024533 A1 | 1/2009 | Fernandes et al. | |
| 2009/0040116 A1 | 2/2009 | Eray | |
| 2009/0064045 A1 | 3/2009 | Tremblay | |
| 2009/0065571 A1 | 3/2009 | Jain | |
| 2009/0065572 A1 | 3/2009 | Jain | |
| 2009/0068982 A1 | 3/2009 | Chen et al. | |
| 2009/0098825 A1 | 4/2009 | Huomo et al. | |
| 2009/0103732 A1 | 4/2009 | Benteo et al. | |
| 2009/0108063 A1 | 4/2009 | Jain et al. | |
| 2009/0115571 A1 | 5/2009 | Bishop et al. | |
| 2009/0127345 A1 | 5/2009 | Chamley et al. | |
| 2009/0137152 A1 | 5/2009 | Tanaka et al. | |
| 2009/0137204 A1 | 5/2009 | Chang | |
| 2009/0143104 A1 | 6/2009 | Loh et al. | |
| 2009/0152361 A1 | 6/2009 | Narendra et al. | |
| 2009/0169013 A1 | 7/2009 | Fascenda et al. | |
| 2009/0177530 A1 | 7/2009 | King et al. | |
| 2009/0181735 A1 | 7/2009 | Griffin et al. | |
| 2009/0192935 A1 | 7/2009 | Griffin et al. | |
| 2009/0193500 A1 | 7/2009 | Griffin et al. | |
| 2009/0210569 A1 | 8/2009 | Lusetti et al. | |
| 2009/0216681 A1 | 8/2009 | McCown | |
| 2009/0224888 A1 | 9/2009 | Caruana | |
| 2009/0234760 A1 | 9/2009 | Walter | |
| 2009/0235037 A1 | 9/2009 | Mounier et al. | |
| 2009/0298540 A1 | 12/2009 | Narendra et al. | |
| 2010/0022273 A1 | 1/2010 | Patrice | |
| 2010/0107230 A1 | 4/2010 | Tyagi et al. | |
| 2010/0114773 A1 | 5/2010 | Skowronek | |
| 2010/0136913 A1 | 6/2010 | Picquenot et al. | |
| 2010/0162377 A1 | 6/2010 | Gonzalez et al. | |
| 2010/0203870 A1 | 8/2010 | Hubinak et al. | |
| 2010/0205373 A1 | 8/2010 | He et al. | |
| 2010/0213265 A1 | 8/2010 | Narendra et al. | |
| 2010/0258639 A1 | 10/2010 | Florek et al. | |
| 2010/0262840 A1 | 10/2010 | Benteo et al. | |
| 2010/0264211 A1 | 10/2010 | Jain et al. | |
| 2010/0274712 A1 | 10/2010 | Mestre et al. | |
| 2011/0145049 A1 | 6/2011 | Hertel et al. | |

FOREIGN PATENT DOCUMENTS

| | | |
|---|---|---|
| DE | 20 2006 001 690 | 4/2006 |
| EP | 1 111 557 | 6/2001 |
| EP | 1 306 760 | 5/2003 |
| EP | 1 626 349 | 2/2006 |
| EP | 1 770 601 | 4/2007 |
| EP | 1 773 059 | 4/2007 |
| EP | 1 933 259 | 6/2008 |
| JP | 4083447 | 3/1992 |
| WO | 91/12698 | 8/1991 |
| WO | 99/34314 | 7/1999 |
| WO | 00/28490 | 5/2000 |
| WO | 01/22695 | 3/2001 |
| WO | 01/48688 | 7/2001 |
| WO | 02/11074 | 2/2002 |
| WO | 2005/119607 | 12/2005 |
| WO | 2005/119608 | 12/2005 |
| WO | 2006/086232 | 8/2006 |
| WO | 2006/091709 | 8/2006 |
| WO | 2006/108184 | 10/2006 |
| WO | 2007/011937 | 1/2007 |
| WO | 2007/011990 | 1/2007 |
| WO | 2007/011991 | 1/2007 |
| WO | 2007/011992 | 1/2007 |
| WO | 2007/052151 | 5/2007 |
| WO | 2007/088898 | 8/2007 |
| WO | 2007/125223 | 11/2007 |

OTHER PUBLICATIONS

Rankl, W., and Effing, W., Smart Card Handbook, Second Edition, John Wiley & Sons, Ltd., Sep. 18, 2000, 32 pages.

Uren P: "Internet Smartcard Benefits for Internet Security Issues" Campus-Wide Information Systems, Emerald Group Publishing Ltd., Bradford, GB, vol. 20, No. 3, Jan. 1, 2003, pp. 105-114 (XP008078638).

U.S. Appl. No. 60/222,475 entitled "Electronic Device Cover With Embedded Radio Frequency (RF) Transponder and Methods of Using Same", inventor Zalewski, filed Aug. 2, 2000; 46 pages.

Office Action issued in U.S. Appl. No. 12/205,796 on Dec. 1, 2011; 13 pages.

Office Action issued in U.S. Appl. No. 12/205,807 on Feb. 23, 2011; 15 pages.

Office Action issued in U.S. Appl. No. 12/205,807 on Jul. 14, 2011; 16 pages.

Advisory Action issued in U.S. Appl. No. 12/205,807 on Sep. 26, 2011; 3 pages.

Office Action issued in U.S. Appl. No. 12/205,814 on Sep. 15, 2011; 20 pages.

Office Action issued in U.S. Appl. No. 12/205,821 on Oct. 13, 2010; 15 pages.

Office Action issued in U.S. Appl. No. 12/205,821 on Apr. 1, 2011; 15 pages.

Office Action issued in U.S. Appl. No. 12/205,821 on Jun. 15, 2011; 15 pages.

Notice of Allowance issued in U.S. Appl. No. 12/205,821 on Dec. 19, 2011; 11 pages.

Office Action issued in U.S. Appl. No. 12/206,564 on Nov. 23, 2010; 15 pages.

Notice of Allowance issued in U.S. Appl. No. 12/206,564 on Mar. 30, 2011; 8 pages.

Office Action issued in U.S. Appl. No. 13/108,717 on Feb. 9, 2012; 19 pages.

Notice of Allowance issued in U.S. Appl. No. 12/209,810 on Feb. 2, 2011; 8 pages.

Notice of Allowance issued in U.S. Appl. No. 13/074,744 on Dec. 14, 2011; 10 pages.

Office Action issued in U.S. Appl. No. 12/209,950 on Jan. 12, 2012; 30 pages.

Office Action issued in U.S. Appl. No. 12/210,167 on Dec. 16, 2011; 15 pages.

Office Action issued in U.S. Appl. No. 12/209,087 on Nov. 4, 2009; 42 pages.

Office Action issued in U.S. Appl. No. 12/209,087 on Jul. 7, 2010; 36 pages.

Office Action issued in U.S. Appl. No. 12/210,176 on Nov. 2, 2011; 21 pages.

Office Action issued in U.S. Appl. No. 12/272,527 on Mar. 16, 2011; 8 pages.

Office Action issued in U.S. Appl. No. 12/272,527 on Sep. 9, 2011; 8 pages.

Office Action issued in U.S. Appl. No. 12/568,592 on Jun. 27, 2011; 11 pages.

Notice of Allowance issued in U.S. Appl. No. 12/568,592 on Sep. 30, 2011; 7 pages.

Office Action issued in U.S. Appl. No. 12/571,163 on Jun. 16, 2011; 10 pages.

Office Action issued in U.S. Appl. No. 12/571,163 on Nov. 9, 2011; 9 pages.

International Preliminary Report on Patentability issued in international Application No. PCT/US2008/075977 on Dec. 30, 2009; 6 pages.

Notification of Transmittal of the International Search Report and the Written Opinion of the International Searching Authority issued in International Application No. PCT/US2008/076006 on Dec. 16, 2008; 13 pages.

International Preliminary Report on Patentability issued in International Application No. PCT/US2008/076006 on Dec. 29, 2009; 11 pages.

Notification of Transmittal of the International Search Report and the Written Opinion of the International Searching Authority issued in International Application No. PCT/US2008/076033 on Jan. 5, 2009; 12 pages.
International Preliminary Report on Patentability issued in International Application No. PCT/US2008/076033 on Dec. 29, 2009; 7 pages.
International Search Report and Written Opinion of the International Searching Authority issued in International Application No. PCT/US2008/076046 on Jan. 8, 2010; 14 pages.
International Preliminary Report on Patentability issued in International Application No. PCT/US2008/076046 on Mar. 16, 2010; 8 pages.
International Preliminary Report on Patentability issued in International Application No. PCT/US2008/076046 on May 21, 2010; 13 pages.
Notification of Transmittal of the International Search Report and the Written Opinion of the International Searching Authority issued in International Application No. PCT/US2008/076275 on Apr. 16, 2009; 15 pages.
International Search Report and Written Opinion issued in International Application No. PCT/US2008/076307 on May 26, 2009; 15 pages.
Notification of Transmittal of the International Search Report and the Written Opinion of the International Searching Authority issued in International Application No. PCT/US2008/076318 on Feb. 2, 2009; 14 pages.
International Preliminary Report on Patentability issued in International Application No. PCT/US2008/076318 on Sep. 11, 2009; 12 pages.
Notification of Transmittal of the International Search Report and the Written Opinion of the International Searching Authority issued in International Application No. PCT/US2008/076158 on Dec. 11, 2008; 14 pages.
International Preliminary Report on Patentability issued in International Application No. PCT/US2008/076158 on Dec. 29, 2009; 13 pages.
Notification of Transmittal of the International Search Report and the Written Opinion of the International Searching Authority issued in International Application No. PCT/US2008/076316 on Jan. 13, 2009; 14 pages.
International Preliminary Report on Patentability issued in international Application No. PCT/US2008/076316 on Nov. 27, 2009; 19 pages.
Notification of Transmittal of the International Search Report and the Written Opinion of the International Searching Authority issued in International Application No. PCT/US2008/076319 on Jan. 14, 2009; 15 pages.
International Preliminary Report on Patentability issued in International Application No. PCT/US2008/076319 on Dec. 16, 2009; 12 pages.
International Search Report and Written Opinion issued in International Application No. PCT/US2009/061032 on Mar. 30, 2010; 14 pages.
International Preliminary Report on Patentability issued in International Application No. PCT/US2009/061018 on Sep. 26, 2011; 6 pages.
International Search Report and Written Opinion issued in International Application No. PCT/US2009/061018 on Mar. 1, 2010; 14 pages.
International Preliminary Report on Patentability issued in International Application No. PCT/US2009/061032 on Jan. 18, 2012; 17 pages.
International Search Report and Written Opinion of the International Searching Authority issued in International Application No. PCT/US2011/035548 on Dec. 14, 2011; 8 pages.
Office Action issued in Chinese Application No. 200880107195.2 on Sep. 7, 2011; 13 pages.
Office Action issued in Chinese Application No. 200880107013.1 on Sep. 28, 2011; 8 pages.
Communication Pursuant to Article 94(3) EPC issued in European Application No. 08830698.0 on Nov. 29, 2010; 5 pages.
Communication Pursuant to Article 94(3) EPC issued in EP Application No. 08 830 698.0, dated Sep. 12, 2011, 4 pages.
Communication under Rule 71(3) issued in European Application No. 08830004.1 on Dec. 22, 2010; 70 pages.
Communication Pursuant to Article 94(3) EPC issued in European Application No. 08830136.1 on Nov. 29, 2010; 3 pages.
Office Action issued in Mexican Application No. MX/a/2010/002838 on Oct. 28, 2011; 2 pages.
Office Action issued in Mexican Application No. MX/a/2010/002833 on Jul. 14, 2011; 2 pages.
U.S. Appl. No. 12/205,796, entitled "Wirelessly Executing Financial Transactions", inventor Jain, filed Sep. 5, 2009.
U.S. Appl. No. 12/205,807, entitled "Interfacign Transaction Cards With Host Devices", inventor Jain, filed Sep. 5, 2008.
U.S. Appl. No. 12/205,814, entitled "Presenting Web Pages Through Mobile Host Devices", inventor Jain, filed Sep. 5, 2009.
U.S. Appl. No. 12/205,821, entitled "Selectively Switching Antennas of Transaction Cards", inventor Jain, filed Sep. 5, 2008.
U.S. Appl. No. 12/206,564,entitled "Wirelessly Executing Transactions With Different Enterprises", inventor Jain, filed Sep. 8, 2008.
U.S. Appl. No. 12/209,810, entitled "Updating Mobile Devices With Additional Elements", inventors Jain et al., filed Sep. 12, 2008.
U.S. Appl. No. 12/678,052 entitled "Updating Mobile Devices with Additional Elements", inventors Jain et al., filed Mar. 12, 2010.
U.S. Appl. No. 12/209,950, entitled "Wirelessly Accessing Broadband Services Using Intelligent Cards", inventor Jain, filed Sep. 12, 2008.
U.S. Appl. No. 12/210,167, entitled "Wirelessly Receiving Broadcast Signals Using Intelligent Cards", inventor Jain, filed Sep. 12, 2008.
U.S. Appl. No. 12/209,087, entitled "Wirelessly Executing Financial Transactions", inventor Jain, filed Sep. 11, 2008.
U.S. Appl. No. 12/678,047 entitled "Wirelessly Accessing Broadband Services Using Intelligent Covers", inventors Jain et al., filed Mar. 12, 2010.
U.S. Appl. No. 12/210,176, entitled "Receiving Broadcast Signals Using Intelligent Covers for Mobile Devices", inventors Jain, et al., filed Sep. 12, 2008.
U.S. Appl. No. 12/678,085 entitled "Receiving Broadcast Signals Using Intelligent Covers for Mobile Devices", inventors Jain et al., filed Mar. 12, 2010.
U.S. Appl. No. 12/272,527, entitled "Wirelessly Communicating Radio Frequency Signals", inventors Jain, et al., filed Nov. 17, 2008.
U.S. Appl. No. 12/571,163, entitled "Amplifying Radio Frequency Signals", inventor Jain, filed Sep. 30, 2008.
U.S. Appl. No. 12/776,285 entitled "Magnetically Coupling Radio Frequency Antennas", inventor Jain, filed May 7, 2010.
Notification of Transmittal of the International Search Report and the Written Opinion of the International Searching Authority issued in International Application No. PCT/US2008/075977 on Dec. 29, 2008; 12 pages.
International Preliminary Report on Patentability issued in International Application No. PCT/US2008/076275 on Dec. 10, 2009; 14 pages.
Herzberg, Amir "Payments and Banking with Mobile Personal Devices", Communications of the ACM, May 2003; vol. 46, No. 5; pp. 53-58.
Notice of Allowance issued in U.S. Appl. No. 12/205,796 08/20/12 issued on Jul. 2, 2012; 10 pages.
Office Action issued in U.S. Appl. No. 12/205,807 on Jun. 7, 2012; 14 pages.
Office Action issued in U.S. Appl. No. 12/205,814 on Feb. 28, 2012; 23 pages.
Office Action issued in U.S. Appl. No. 13/367,022 on Mar. 13, 2012; 15 pages.
Notice of Allowance issued in U.S. Appl. No. 13/367,022 on Oct. 24, 2012; 9 pages.
Office Action issued in U.S. Appl. No. 13/107,717 on Oct. 5, 2011; 18 pages.
Office Action issued in U.S. Appl. No. 13/108,717 on May 1, 2012; 20 pages.
Office Action issued in U.S. Appl. No. 13/108,717 on Sep. 6, 2012; 6 pages.

Office Action issued in U.S. Appl. No. 12/209,950 on Jun. 21, 2012; 34 pages.
Office Action issued in U.S. Appl. No. 12/210,167 on Jul. 19, 2012; 15 pages.
Office Action issued in U.S. Appl. No. 12/210,161 on Sep. 2, 2011; 10 pages.
Office Action issued in U.S. Appl. No. 12/210,161 on Dec. 20, 2011; 14 pages.
Notice of Allowance issued in U.S. Appl. No. 12/210,161 on Mar. 2, 2012; 10 pages.
Office Action issued in U.S. Appl. No. 12/210,176 on Apr. 5, 2012; 19 pages.
Office Action issued in U.S. Appl. No. 13/302,766 on May 29, 2012; 9 pages.
Office Action issued in U.S. Appl. No. 13/302,766 on Oct. 16, 2012; 10 pages.
Office Action issued in U.S. Appl. No. 13/306,588 on Sep. 19, 2012; 11 pages.
Office Action issued in U.S. Appl. No. 12/776,285 on Mar. 23, 2012; 14 pages.
Examination report issued in Australian Application No. 2008298581 on Oct. 4, 2012; 3 pages.
Examination report issued in Australian Application No. 2008298677 on Jun. 6, 2012; 2 pages.
Office Action issued in Chinese Application No. 200880107195.2 on May 29, 2012; 10 pages.
Office Action issued in Chinese Application No. 200880107187.8 on Apr. 28, 2012; 10 pages.
Notice of Allowance issued in Chinese Application No. 200880107013.1 on Apr. 28, 2012; 4 pages.
Communication under Rule 71(3) issued in European Application No. 08830136.1 on Sep. 30, 2011; 67 pages.
U.S. Appl. No. 12/210,161, entitled "Wirelessly Accessing Broadband Services Using Intelligent Covers", inventors Jain, et al., filed Sep. 12, 2008.
U.S. Appl. No. 13/313,866 entitled "Executing Reader Application", inventor Jain, filed Dec. 7, 2011.

\* cited by examiner

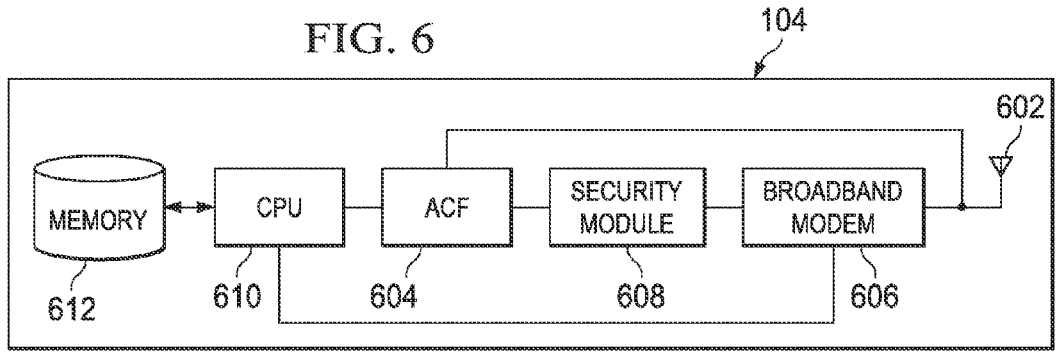
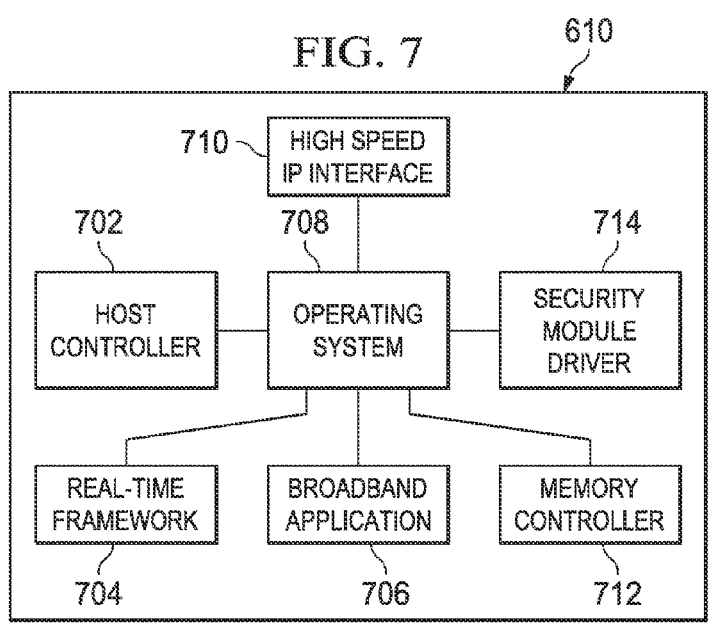
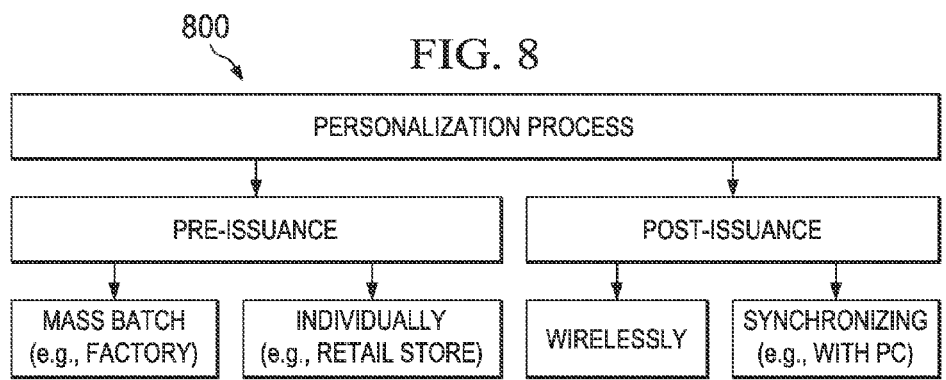

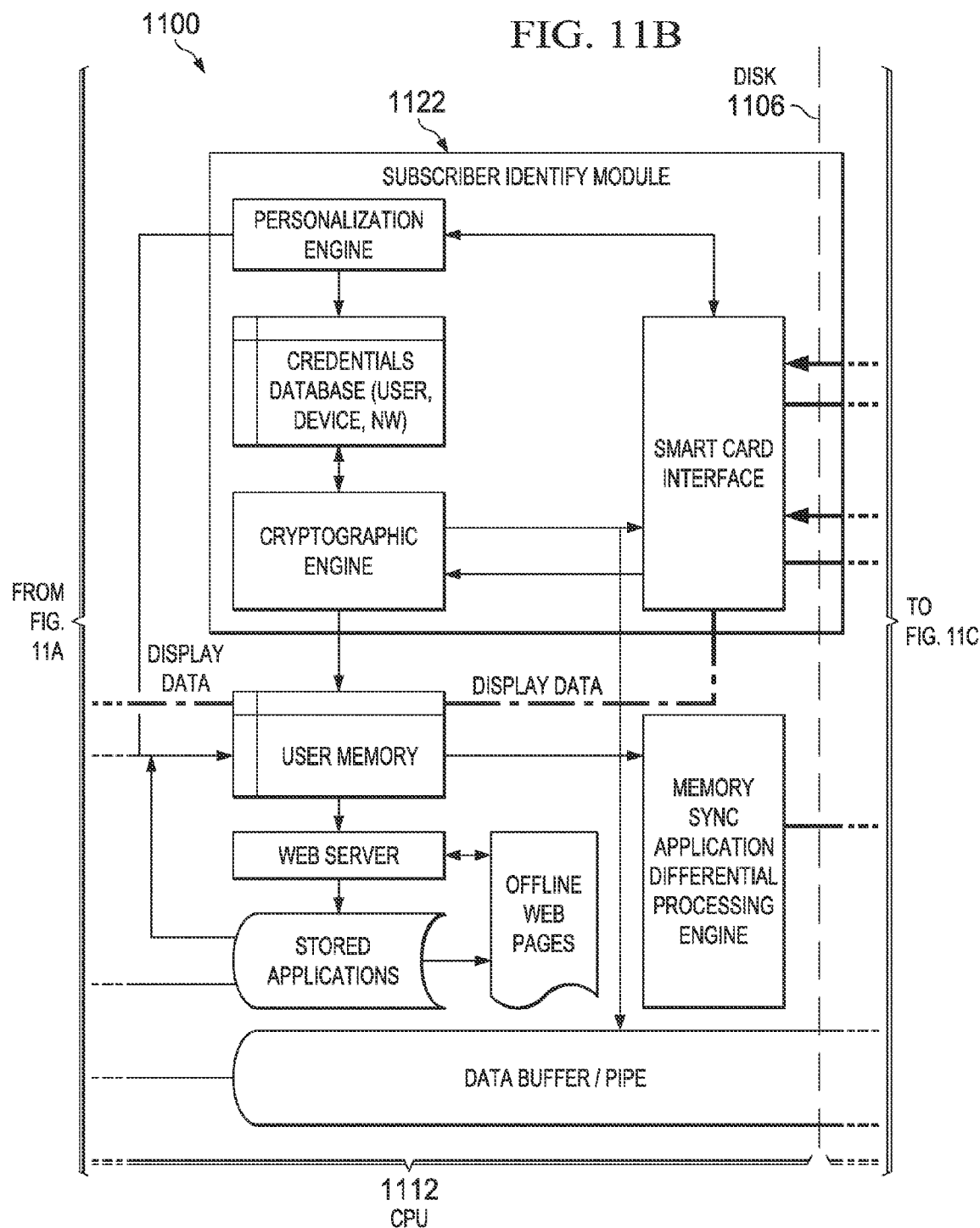

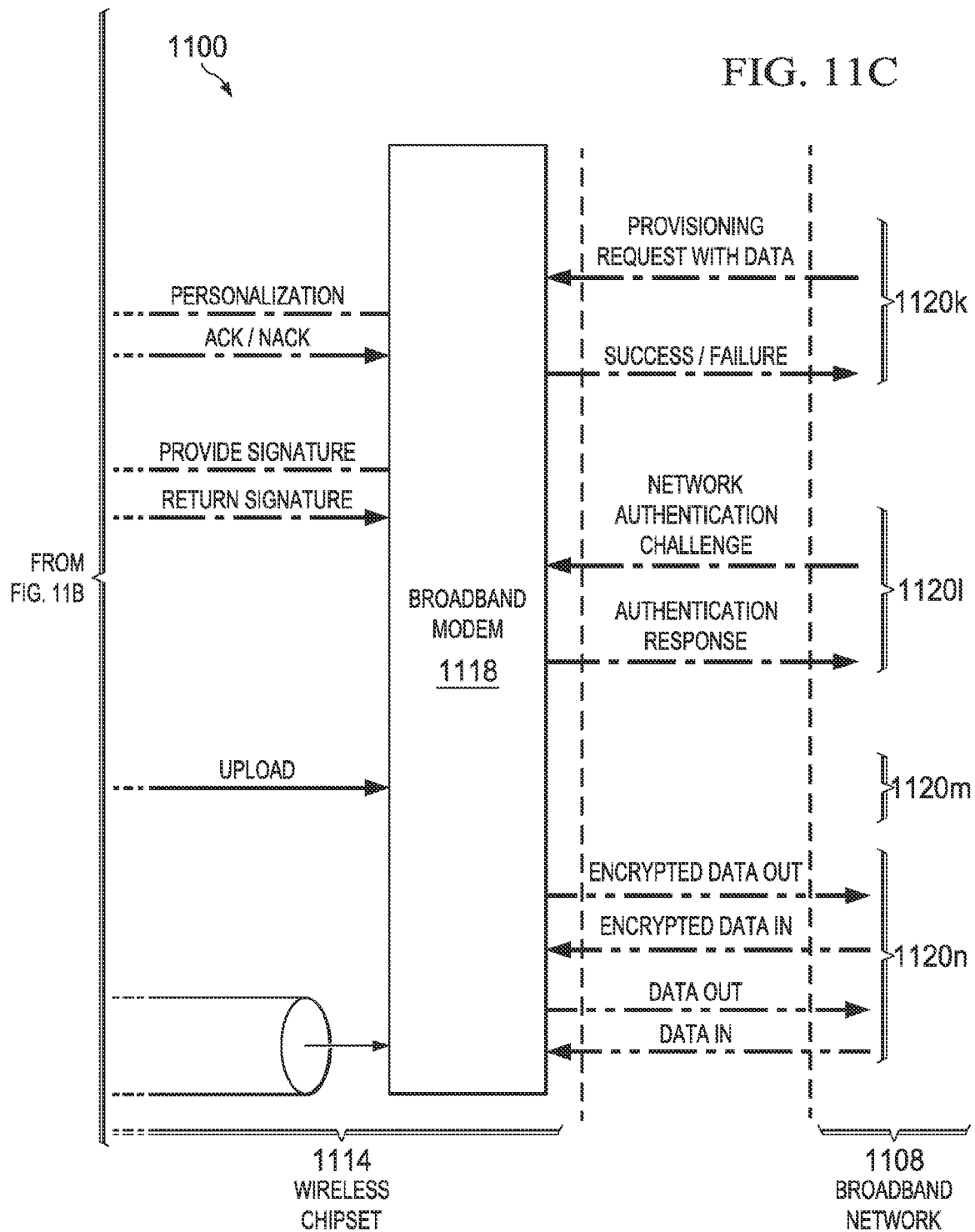

WIRELESSLY ACCESSING BROADBAND SERVICES USING INTELLIGENT COVERS

CLAIM OF PRIORITY

This application is a continuation of and claims priority under 35 USC §120 to U.S. patent application Ser. No. 12/210,161, filed on Sep. 12, 2008, which claims priority under 35 USC §119(e) to U.S. Patent Application Ser. No. 60/971,813, filed on Sep. 12, 2007, the entire contents of which are hereby incorporated by reference.

TECHNICAL FIELD

This invention relates to network communication and, more particularly to wirelessly accessing broadband services using intelligent covers.

BACKGROUND

Portable electronic devices and tokens have become an integrated part of the regular day to day user experience. There is a wide variety of common portable and handheld devices that users have in their possession including communication, business and entertaining devices such as cell phones, music players, digital cameras, smart cards, memory token and variety of possible combinations of the aforementioned devices and tokens. All of these devices share the commonality that consumer are accustomed to carrying them with them most of the time and to most places. This is true across the various demographics and age groups regardless of the level of the sophistication of the consumer, their age group, their technical level or background.

These common handheld devices offer options for expandable memory. Micro Secure Digital (microSD) is the popular interface across high-end cellphones while SD and MultiMediaCard (MMC) interfaces are also available in limited models. MicroSD is the least common denominator supported by the majority of these devices and tokens (in terms of size). In addition, adaptors are available to convert a MicroSD into MiniSD, SD, MMC and USB Although most popular MP3 player (iPOD) offer's a proprietary interface, competing designs do offer standard interfaces. Digital cameras offer mostly SD and MMC while extreme Digital (xD) is another option. Micro and Mini versions of these interfaces are also available in several models. Mini-USB is increasingly available across cellphones, digital cameras and MP3 players for synchronization with laptops.

Various solutions exist for providing connectivity for PCs, mobile phones and PDAs to wide area wireless broadband networks. Unlike Wi-Fi, wide area wireless broadband networks use spectrum licensed by a service provider. In order to provide access, the broadband service providers charge an access fee. In the case of consumer devices such as mobile phones and PDAs, the hardware to access the broadband network is typically embedded into the device. In order to secure access and prevent multiple users from sharing the access provided in exchange for the fee, the service provider uses either specially designed software resident on the device that is accessing the network or a removable security token such as the SIM card.

In the case of the PC, these solutions comprise of a hardware modem that can be added to the PC using peripheral interfaces such as USB, PCMCIA, PCIA or mini-PCI (and others). To control access, either a connection manager software is provided by the service provider that authenticates a user using user-id and password and/or a more secure authentication software is used (such as X.509 certificates). This software is typically installed on the PC together with the access driver for the hardware. In some options, the default connection manager provided by the operating system of the PC (such as Windows XP/Vista/MacOS etc.) can be used. In this case, the user is asked to provide his user id and password.

There are other consumer devices such as cameras, camcorders, MP3 players, game players and portable video players that may require broadband internet connection for useful applications. These devices have proprietary operating systems that cannot be expanded easily by installing device drivers. Furthermore, these devices may lack a user interface and keyboard for the user to provide a username and password for authentication. In addition, these devices also lack PCMCIA or USB type expansion slots where broadband modem hardware could be inserted. These devices also typically lack the slot for a hardware security token such as a SIM card in order to provide secure access to a fee based wireless broadband service provider. These devices also need memory for the users to store content captured through these devices. The need for such memory is growing at a rapid rate.

SUMMARY

The present disclosure is directed to a system and method for wirelessly accessing broadband services using intelligent covers. In some implementations, a cover for a consumer device includes side surfaces, a rear surface, a physical interface, a circuit, and a broadband service card. The side surfaces and a rear surface form an opening that receives at least a portion of a consumer device. A first portion of at least one of the surfaces includes a connector for connecting to a port of the consumer device. The circuit connects the physical interface to the connector. The broadband service card connected to the physical interface and accesses a service foreign through the wireless broadband network independent of the consumer device.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is an example transaction card for accessing broadband services;

FIG. 7 is Central Processing Unit of FIG. 6 in accordance with some implementations of the present disclosure;

FIG. 8 is a schematic diagram illustrating personalization processes of intelligent cards;

FIG. 11A, 11B and 1C are examples of call flow illustrating call sessions with an intelligent card;

Like reference symbols in the various drawings indicate like elements.

DETAILED DESCRIPTION

Figure 1:
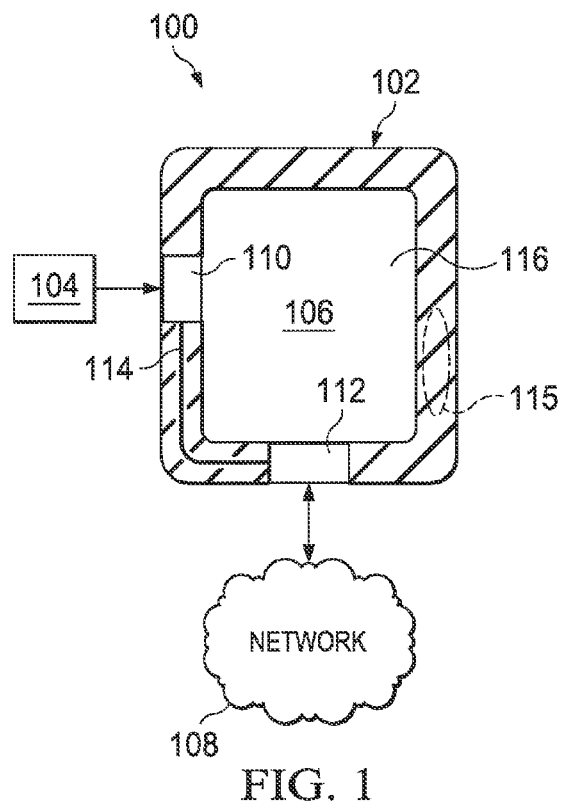
FIG. 1 is an example updating system in accordance with some implementations of the present disclosure.

FIG. 1 is a block diagram illustrating an example system 100 for augmenting a mobile device, for example an iPhone, with additional external devices using a cover for the mobile device. For example, the system 100 may add an external microSecureDigital (microSD) slot to a mobile host device, for example an iPhone, using a flexible cover that encloses at least a portion of the mobile device and connects to a port of the mobile device. Aside from microSD, the system 100 may add an external memory device to a mobile device using other interfaces such as, for example, MultiMediaCard (MMC), SD, miniSD, Firewire, and/or others. By adding external devices (e.g., memory, transaction cards), the system 100 may upgrade a mobile device that does not include expansion slots with additional external devices while substantially maintaining the dimensions of the device. For example, the cover may increase the dimensions of the by 5 percent or less. In other words, the cover may add a device slots to a mobile device while substantially maintaining original attributes such as speaker outputs, network signal strength, headphone jacks, battery charging, docking ports, and others. In some implementations, the system 100 may wirelessly access broadband services using the intelligent card. For example, the intelligent card may wirelessly execute security processes with a broadband service provider using a single intelligent card. In such implementations, each of the transactions can securely identify a user and user privileges with respect to the services being received from the different enterprises. In some of these implementations, the cover may include a circuit that converts signals between a form compatible with an external memory device (e.g., microSD) and a form compatible with the mobile device (e.g., USB). In addition, the system 100 may include an intelligent card integrated into an the cover such that removable may at least partially damage the cover.

At a high level, the system 100 includes a cover 102, an external device 104, a mobile device 106 and a network 108. The cover 102 including a slot 110 for connecting to the external device 104, a connector 112 for connecting to the mobile device 106, and a circuit 114 for communicably connecting the slot 110, an antenna 115 for boosting transmission and reception of RF signals, and the connector 112. The cover 102 may update the mobile device 106 with an external device 104. In addition, the cover 102 encloses at least a portion of the mobile device 106. In the case of enclosing a portion of the mobile device 106, the cover 102 may include other aspects that expose ports of the mobile device 106 for connecting with external peripherals such that the cover 102 does not substantially interfere with such connections. In other words, the cover 102 may either include ports substantially aligned with ports of the mobile device 106 or provide openings that allow substantially unrestricted access to the original ports of the device 106 (see FIG. 2C). The mobile device 106 may be communicable coupled to the network 108. The mobile device 106 includes a Graphical User Interface (GUI) 116 for presenting information to and/or receiving information from users.

The cover 102 can include any software, hardware, and/or firmware configured to update the mobile device 106 with one or more external devices slots. For example, the cover 102 may include a microSD slot and a physical interface for connecting to a port of the mobile device. In this example, the cover 102 may connect the microSD slot to the mobile device 106 using the physical interface. In some implementations, the cover 102 may include one or more of the following: one or more slots for external devices (e.g., memory, wireless transaction cards); one or more connectors that connect to the mobile device 106; one or more circuits for connecting the one or more slots to the one or more connectors; a conversion module that converts signals between different formats; a biometric reader that determines biometric information of a user of the mobile device 106; and/or other elements. In some implementations, the cover 102 may be formed of a flexible material such as, for example, silicone rubber, a soft neoprene, and/or other material. The opening formed by the cover 102 may be substantially be the same as or less than the dimensions of the mobile device 106. In the case of the opening dimensions being less, the cover 102 may be slightly flexible to stretch over the mobile device 106. The cover 102 may substantially maintain attributes of the mobile device 106, such as dimensions, accessibility to peripherals as provided by the device, charging, battery life, signal strength, access to display and all other input devices, connectivity to the wireless network if any, interface capability to a PC if any and any other features provided by the device. In maintaining the attributes, the added functionality may not degrade the device performance in any manner such that certification by regulatory authorities (e.g., FCC) and warranty by the issuer of the device 106 is compromised.

In the illustrated implementation, the cover 102 includes the slot 110, the connector 112 and the circuit 114. The slot 110 may comprise an MMC, miniMMC, microMMC, SD, miniSD, microSD, and/or other slots. The slot 110 may including an opening such that the external device 104 may be inserted after the mobile device 106 is inserted into the cover 102. In some implementations, the slot 110 may be formed in the rear surface such that cover 102 is removed or at least portion moved away from the surface of the mobile device 106 to insert the external device 104. In some implementations, the slot 110 and the external device 104 are integrated into the cover 102, and in this case, the external device 104 may not be removable without damaging the cover 102. The connector 112 includes at least a portion that connects to a port of the mobile device 106. The connector 112 may include a USB, iDock, microUSB, Firewire, Serial, and/or other connectors offered by the mobile device 106. In some implementations, the connector 112 may include a first interface for connecting to the mobile device 106 and a second interface for connecting with external devices. The second interface may be substantially similar in dimensions and interface capabilities as the original connector of the mobile device 106. In these instances, the connector 112 may pass one or more signals from external devices to the mobile device 106 without, for example, interfering with the connecting to the external device 104. For example, the connector 112 may include a second interface that connects with the power supply of the mobile device 106 and passes the signal to the mobile device 106 for charging. The circuit 114 can include any software, hardware, and firmware for communicably connecting the slot 110 with the connector 112. For example, the circuit 114 may include one or more wired connections between the slot 110 and the connector 112. In addition, the circuit 114 may also include a booster antenna that may enhance the signal reception capability of the mobile device 106 and/or the signal reception capability of any wireless transaction cards inserted into the slot 110 (see FIG. 2A). In some implementations, the circuit 114 may execute one or more of the following: pass signals between the slot 110 and the connector 112; translated or otherwise convert signals between forms compatible with the external device 104 and forms compatible with the mobile device 106; detect biometric information of a user of the mobile device 106; manage access to the external device 104 based, at least in part, on detected biometric information; enhance signal reception of the host device via an integrated booster antenna; enhance signal reception of a wireless transaction card inserted into the slot; provide access to software and system on the device inserted into the slot for an application residing on the mobile device; and/or other processes.

The external device 104 can include any software, hardware, and/or firmware configured to update the mobile device 106 with one or more features and/or functions. For example, the external device 104 may include solid-state memory (e.g., flash, EEPROM) for storing information received, for example, from the mobile device 106. The external device 104 may update the mobile device 106 with, for example, external memory, a wireless transaction card, a broadcast receiver, a broadband transceiver, and/or other elements. In regards to memory, the external device 104 may be a Flash or memory package, which is non-volatile memory that may be electrically erased and reprogrammed. The external device 104 may be a memory card, USB Flash drives, and/or other memory device. For example, the external device 104 may include Electrically Erasable Programmable Read-Only Memory (EEPROM) that is erased and programmed in blocks. In regards to memory cards, the external device 104 may be MMC, microMMC, miniMMC, SD, microSD, miniSD, Memory Stick, Memory Stick Duo, xD-Picture Card, Secure Digital High Capacity (SDHC), and/or other memory card. In some implementations, the external device 104 may include a memory capacity between 1 MB and 1 TB. Alternatively or in addition, the external device 104 may be a transaction card as discussed with respect to FIGS. 5 to 14. In these implementations, the external card 104 may wirelessly wireless broadband services. In some implementations, the external card 104 is integrated/embedded into the cover 102.

The mobile device 106 comprises an electronic device operable to interface with the cover 102 using one or more ports. For example, the mobile device 106 may have an iDock port that connects with the cover 102. As used in this disclosure, the mobile device 106 is intended to encompass cellular phones (e.g., iPhone), data phones, pagers, portable computers, SIP phones, smart phones, personal data assistants (PDAs), digital cameras, MP3 players, camcorders, one or more processors within these or other devices, or any other suitable processing devices capable of communicating information with the cover 102 through one or more ports and may not have otherwise have a slot for external card 104 could be directly plugged in. The one or more ports may include, for example, a USB port, an iDock port, a FireWire port, a serial port and/or any other interface port provided by the mobile device for connectivity with peripherals, and/or other ports. In some implementations, the mobile devices 106 may be based on cellular radio technology. For example, the mobile device 106 may be a PDA operable to wirelessly connect with an external or unsecured network. In another example, the mobile device 106 may comprise a digital multimedia player that includes an input device, such as a keypad, a jog wheel, a jog dial, touch screen, or other device that can accept information or allows selection of user interface elements, and an output device that conveys information associated with the system 100, including digital data, visual information, or GUI 116.

The GUI 116 comprises a graphical user interface operable to allow the user of the mobile device 106 to interface with at least a portion of the system 100 for any suitable purpose, such as executing transactions and/or and presenting transaction history. Generally, the GUI 116 provides the particular user with an efficient and user-friendly presentation of data provided by or communicated within the system 100 and/or also an efficient and user-friendly means for the user to self-manage settings and access services offered by an institution. The GUI 116 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 116 can include any graphical user interface, such as a generic web browser or touch screen, that processes information in the system 100 and presents the results to the user.

Network 108 facilitates wireless or wired communication between institutions and any other local or remote computer, such as the mobile device 106. Network 108 may be all or a portion of an enterprise or secured network. While illustrated as single network, network 108 may be a continuous network logically divided into various sub-nets or virtual networks without departing from the scope of this disclosure, so long as at least a portion of network 108 may facilitate communications with the mobile device 106. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2A:
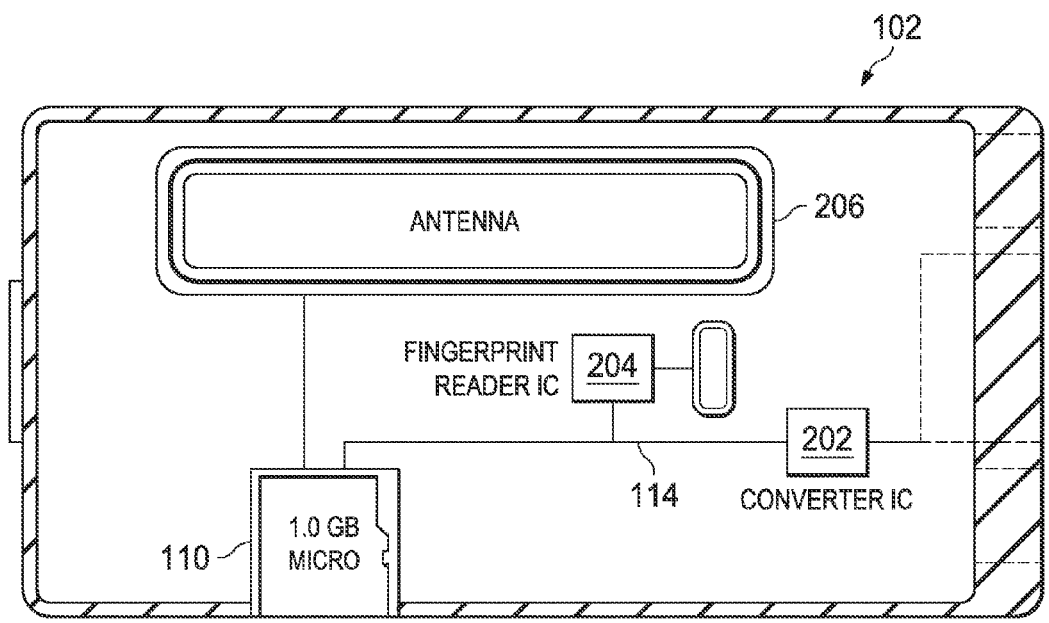
FIGS. 2A to 2C illustrate cross sectional views of some implementations of the cover of FIG. 1.
Figure 2B:
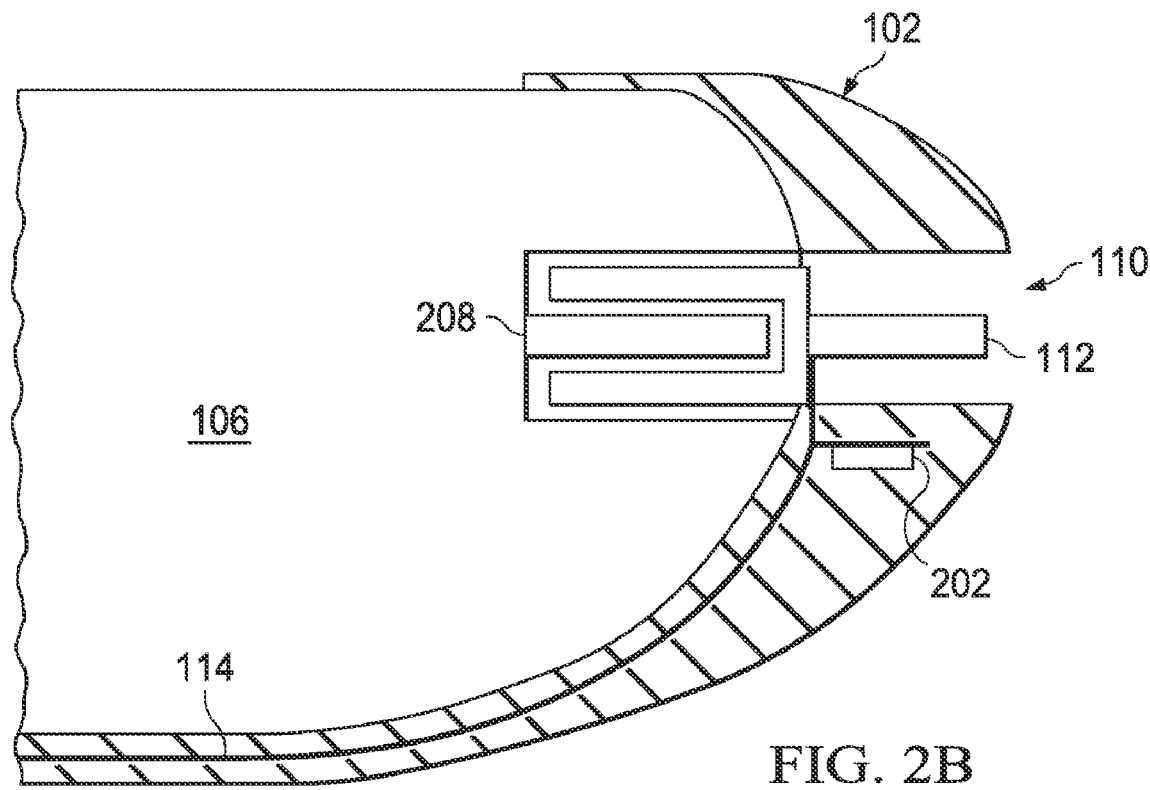
Figure 2C:
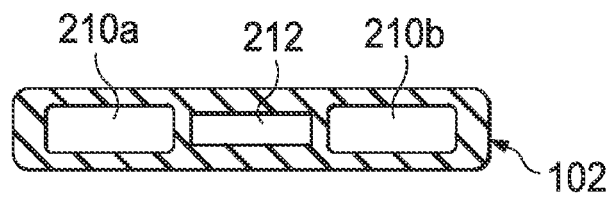

FIGS. 2A to 2C illustrate cross-sectional views of the cover 102 of FIG. 1. In particular, the views illustrate the components of the cover 102 that at least augment the mobile device 106 with the card 104. In FIG. 2A, the cover 102 includes a port-to-card converter module 202 (e.g., USB-to-microSD), a reader 204, and an antenna 206. The converter module 202 can include any software, hardware, and/or firmware that converts between card-processable signals and signals compatible with the mobile device 106. In the illustrated example, the converter module 202 converts between SD signals and USB signals. The reader 204 can include any software, hardware, and/or firmware that verifies or otherwise determines user information such as biometric information. In the illustrated example, the reader 204 determines fingerprints of a user and may verify whether the user has access to the card 104. In addition, the reader 204 may pass the biometric information to an application on the mobile device 106 (through the converter 202 and/or the connector) for, for example, to securely verify the identity of the device holder. The mobile host device 106 may include biometric identity verification for applications such as mobile banking In some implementations, an application can use the biometric reader 204 to first register the user's biometric identity on first use and thereafter match the biometric identity of the device holder with the registered biometric identity. The secure storage of the biometric identity for the user may be provided by the removable secure card 104 or could be located on a special secure memory embedded in the cover. For example, when the user changes devices 106, the identity footprint may be erased from the initial device (if he removes the cover 102 and the card 104). In addition, another application running on the CPU of the cover 102 may also use the biometric data to secure access to certain features and/or services. The antenna 206 may wirelessly transmit and receive RF signals associated with the card 104. In the transaction-card implementations, the antenna 206 may extend the transaction range of the card 104 for wirelessly executing transactions. FIG. 2B is another illustration of a cross-sectional view of the cover 102. In this view, a connector 208 of the mobile device 106 is illustrated. For example, the connector 208 may be an iDock connector of an iPhone having 30 pins. FIG. 2C is yet another cross sectional view of the cover 102. In this view, the cover 102 includes the openings 214A and 214B for speakers included with the mobile device 106 and a cavity 212 for connecting a power supply to the connector 112 and the connector 208. In this case, the mobile device 106 may be charged using the connector 208 without removing the cover 102.

Figure 3A:
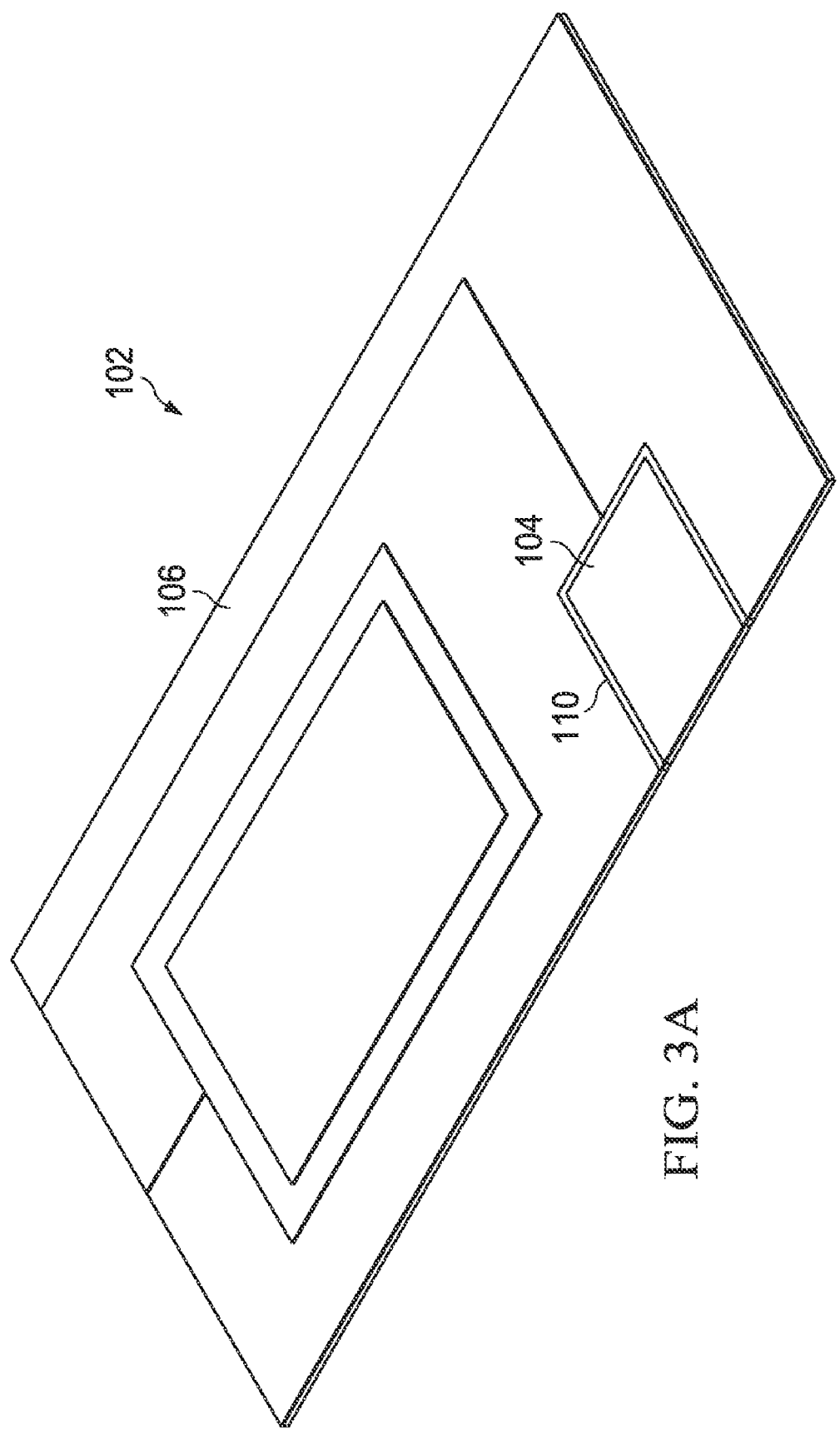
FIGS. 3A and 3B illustrate example slots in the cover of FIG. 1.
Figure 3B:
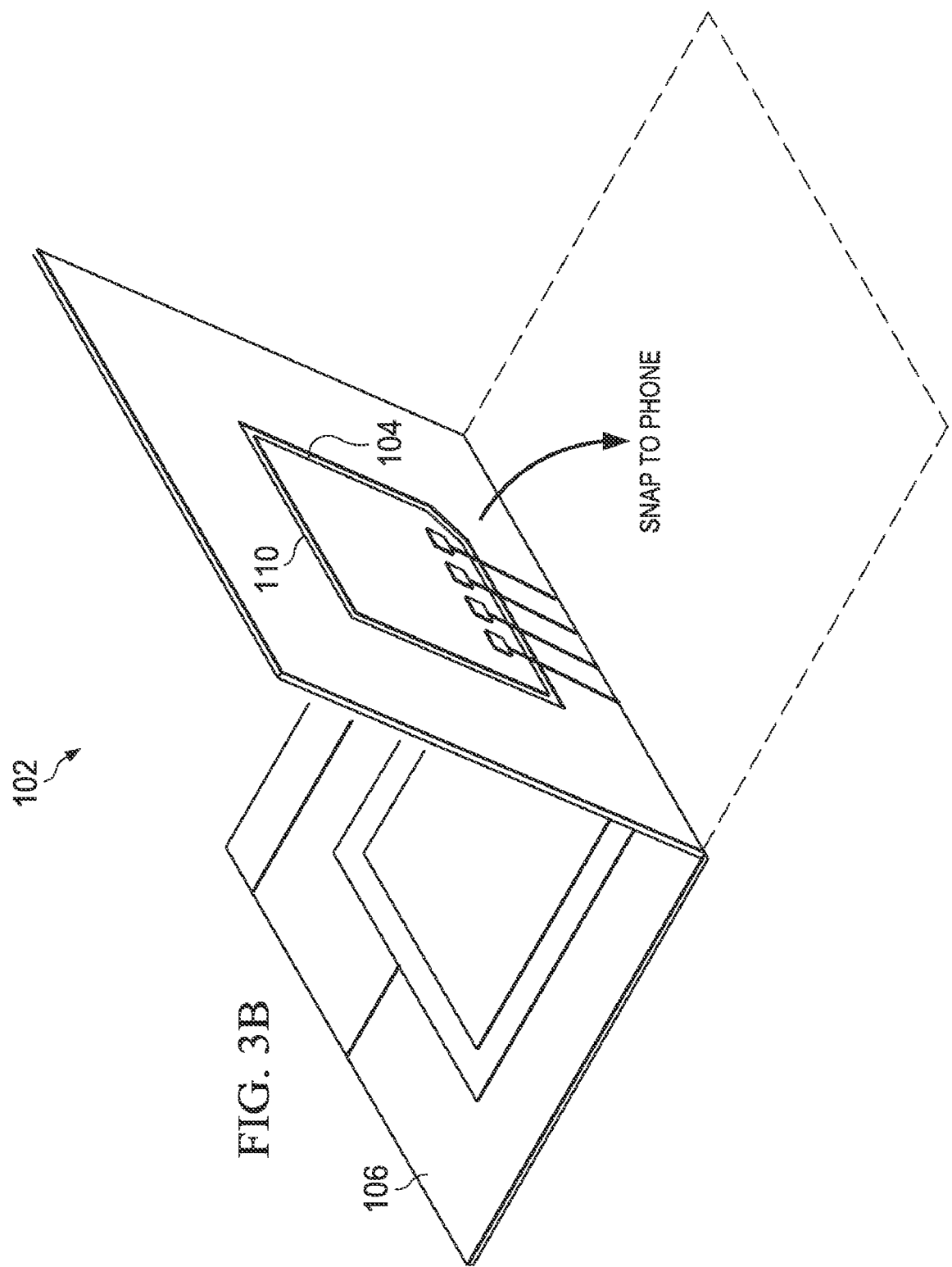

FIGS. 3A and 3B illustrate different implementations of the slot 110. In FIG. 3A, the slot 110 may be formed in the cover 102 such that a card 104 may be inserted and removed without lifting or otherwise removing at least a portion of the cover 102. In FIG. 3B, the slot 110 is formed on the inside of the cover 102 such that the cover is at least partially lifted or otherwise removed to insert and remove the card 104.

Figure 4:
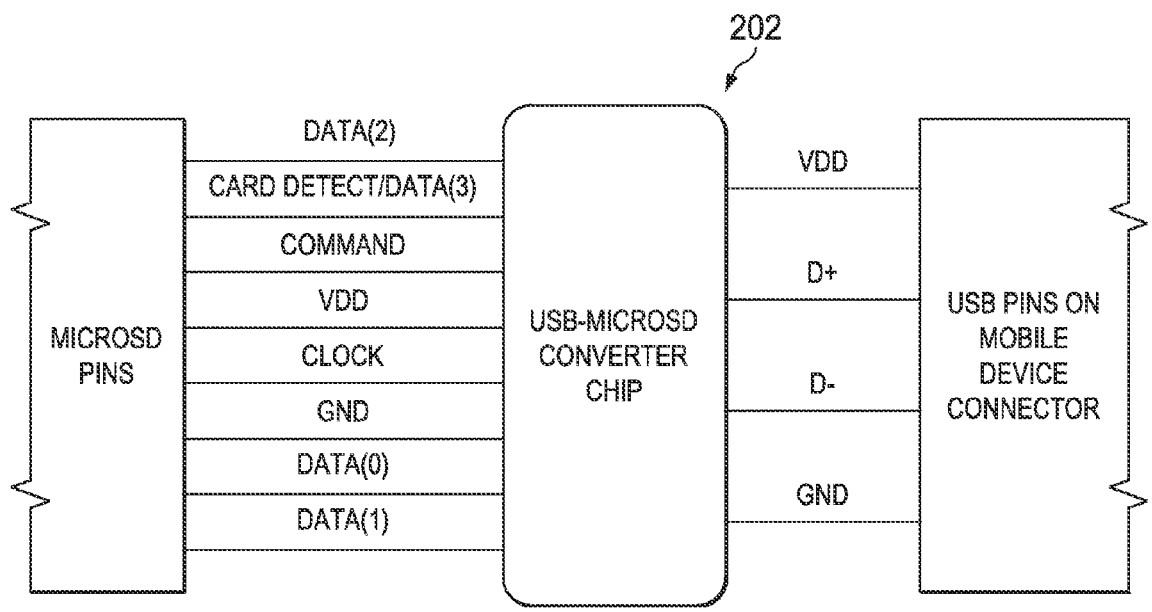
FIG. 4 illustrates an example converter module of the cover of FIG. 1.

FIG. 4 illustrates some implementations of the convert module 202 that converts between USB and SD signals. As illustrated, the converter module 202 may receive a plurality of inputs associated with the card 104 and convert the signals to a form compatible with the connector 208 of the mobile device 106. In some implementations, the converter module 202 may convert, for example, between data formats. In some implementations, the converter module 202 may pass inputs to corresponding outputs such as for VDD and GND.

Figure 5:
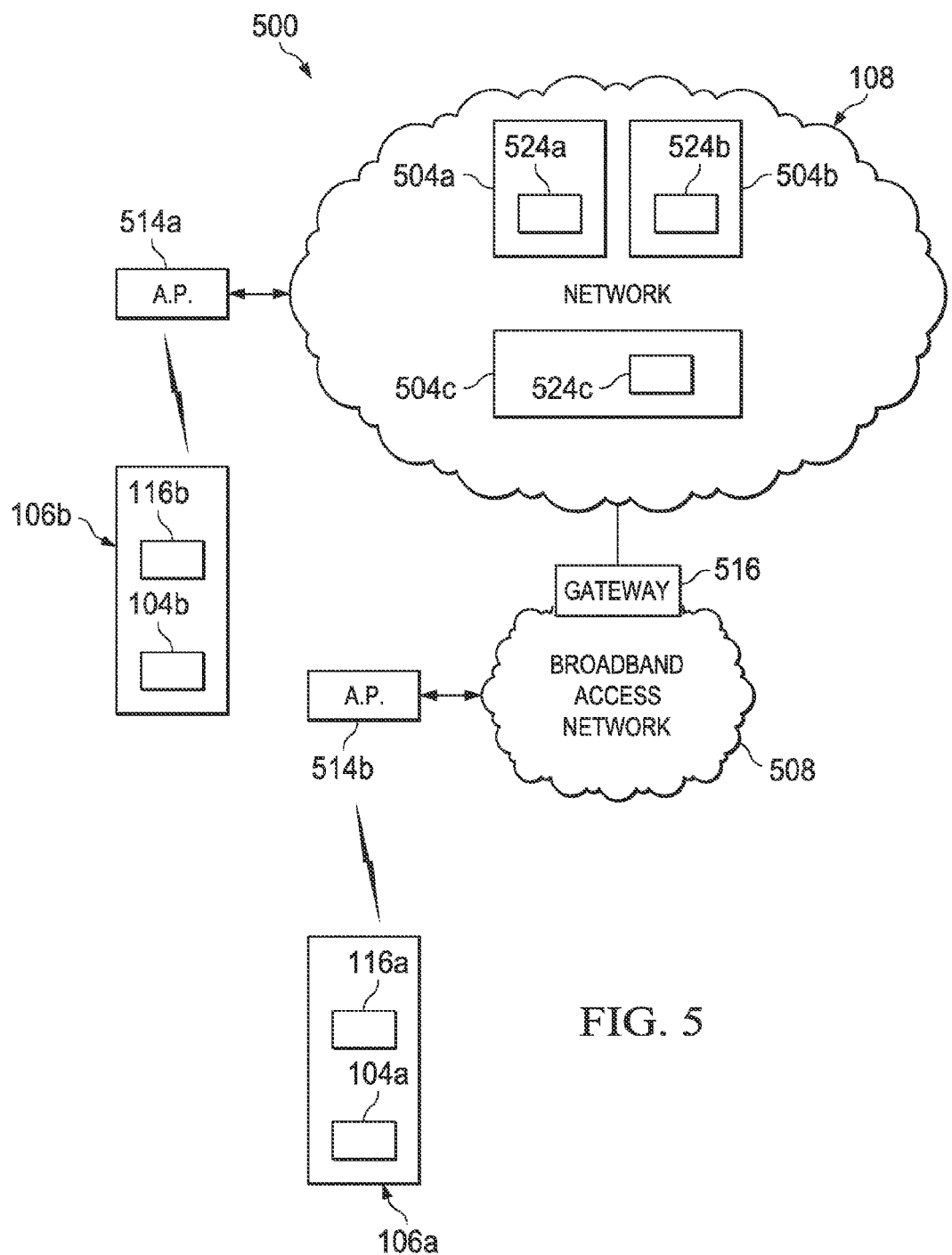
FIG. 5 is an example transaction system in accordance with some implementations of the present disclosure.

FIG. 5 is a block diagram illustrating an example service system 500 for providing foreign services to consumer devices using an intelligent card independent of consumer host device. For example, the system 500 may include a SecureDigital (SD) card that automatically connects and authenticates the user to a wireless broadband network independent of a consumer host device. Foreign, as used herein, means any component, object, value, variable, service and/or data and/or data schema that is not directly processable, accessible, or otherwise capable of communicating with the consumer devices 106. Aside from SD, the system 500 may include other interfaces that connect an intelligent card to the host device such as, for example, MultiMediaCard (MMC), microSD, miniSD, Universal Serial Bus (USB), Apple iDock, Firewire, and/or others. An intelligent card is a device configured to insert into or otherwise attach to a consumer host device and access or otherwise execute services (e.g., receive broadband internet connection, upload data to Internet, access streaming media content and others) independent of the consumer host device. In some implementations, the intelligent card may be shaped as a SD card miniSD card, microSD card including, for example, notches, raised portions and/or other features. The system 500 may modify, translate, or otherwise convert foreign communications to a signal processable by or otherwise native to the consumer device 106. In addition, the system 500 may include an intelligent card that includes a dual interface. The dual interface may connect the intelligent card to both the host device through a physical interface (e.g., SD, MMC, USB) and external devices using broadband technology. In some implementations, broadband technology may include General Packet Radio Service (GPRS), High-Speed Downlink Packet Access (HSDPA), High Speed Packet Access (HSPA), Evolution-Data Optimized (EV-DO), EVolution Data/Voice (EV-DV), Ultra Mobile Broadband (UMB), Worldwide Interoperability for Microwave Access (WiMAX), Long Term Evolution (LTE), other 802.1x based access networks and other IP based wireless broadband networks, and/or any other broadband technology. For example, the system 500 may convert communications between a wireless broadband signal and a signal compatible or otherwise native to the consumer device 106 (e.g., between a WiMAX and SD signal). In internetworking the communication protocols, the system 200 may provides foreign services to the consumer device 106. In some implementations, the conversion of the foreign services to compatible forms may be transparent to the user of the consumer device 106. Foreign services may include accessing network services using Worldwide Interoperability for Microwave Access (WiMax), Third Generation Partnership Project Long Term Evolution (3GPP LTE), High Speed Packet Access (HSPA), Ultra Mobile Broadband (UMB), and/or other broadband services at least partially incompatible with the consumer device 106. The intelligent card in the system 500 may execute one or more of the following: selectively activate an antenna for wireless services in response to at least an event; authenticating with a service provider through a base station offering connectivity to, for example, a wireless broadband network; access services of the wireless broadband service provider independent of the consumer host device; and/or other processes. By providing an intelligent card, the system 500 may securely authenticate to and wirelessly access foreign services without either requiring additional hardware, software, and/or firmware on the consumer host device.

At a high level, the system 500 includes the consumer devices 106a and 106b and the service provider 504 communicably coupled through a core network 108 and/or a broadband access network. The consumer device 106 includes a GUI 116 for providing an interface to the foreign services and a service card 104 for independently converting the foreign services to forms compatible with the consumer device 106. In some implementations, the service card 104 may selectively switch antenna on and off in response to an event such as a selection of a graphical element using the GUI 116. In some implementations, the service card 104 may transmit a request for services to, for example, the access point 114a. The core network 108 and the broadband access network 508 includes access points 114a, for example base stations, for wirelessly communicating services to the service cards 104.

Each consumer device 106 comprises an electronic device operable to interface with the service card 104a. For example, the consumer device 106 may receive and transmit wireless and/or wireless communication with the system 500. As used in this disclosure, the consumer devices 106 are intended to encompass digital cameras, MP3 players, camcorders, PCs, UMPCs, game players, portable media players, cellular phones, data phones, pagers, portable computers, SIP phones, smart phones, personal data assistants (PDAs), one or more processors within these or other devices, or any other suitable processing devices capable of communicating information with the service card 104. In some implementations, the consumer devices 106 may be based on a cellular technology. In some implementations, the consumer device 106 may comprise a digital camera that includes an input device, such as a touch screen or other device that can accept information, and an output device that conveys information associated with a transaction with the service provider 504, including digital data, visual information, or GUI 116.

The GUI 116 comprises a graphical user interface operable to allow the user of the consumer device 106 to interface with at least a portion of the system 500 for any suitable purpose, such as editing configuration and other settings. Generally, the GUI 116 provides the particular user with an efficient and user-friendly presentation of data provided by or communicated within the system 500 and/or also an efficient and user-friendly means for the user to self-manage settings and access services offered by the service provider 504. The GUI 116 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 116 can include any graphical user interface, such as a generic web browser or touch screen, that processes information in the system 500 and presents the results to the user.

The service card 104 can include any software, hardware, and/or firmware configured to wirelessly access foreign services through the access point 114b and/or the access point 114a. For example, the service card 104 may independently access one or more services from the service provider 504 and translate, map or otherwise convert the accessed services to forms compatible with the consumer device 106. In some implementations, the service card 104 can provide the services through the GUI 116 such as streaming video. In wirelessly accessing services, the service card 104 may communicate wide-range, short-range and/or other signals. Wide range signals may include WiMax, 3GPP LTE, HSPA, UMB, and/or other broadband signals. Short range signals may include WiFi, Zigbee, UWB and/or other signals. In some implementations, the service card 104 may include one or more chipsets that execute an operating system and security processes to access foreign services independent of the consumer host device 106. In doing so, the consumer device 106 may not require additional hardware, software, and/or firmware to wirelessly access a foreign service such as uploading contents of memory to the Internet, accessing streaming video, and/or other services. In some implementations, the service card 104 may execute one or more of the following: wirelessly transmit a request for services to the access point 114a and/or access point 114b in response to at least an event; transmit authorization for accessing the requested service (e.g., security information); translate between wireless protocols (e.g., wireless broadband protocols) and protocols compatible with the service card 104; translate between service-card protocols and protocols compatible with consumer device 106; present and receive information (e.g., content request) from the user through the GUI 116; decrypt and encrypt information wirelessly transmitted between the service card 104 and the access point 114a and/or access point 114b; execute applications locally stored in the service card 104; selectively switch the antenna on and off based, at least in part, on one or more events; authenticate user based, at least in part, on information locally stored in the service card 104; authentication processes based, at least in part, on information received, for example, through the GUI 116; transmit a host signature to, for example, wireless broadband network 508 in response to at least an authentication challenge; and/or others. In some implementations, the service card 104 may access a service in response to at least a user selecting a graphical element in the GUI 116. In some implementations, the service card 104 may selectively switch the antenna between an on and off state in response to one or more events (e.g., user request, completion of broadcast). The service card 104 may include a communication module with a protocol translation module, antenna tuning circuit, power circuit and an antenna tuned to exchange wireless data with the networks 108 and/or 508.

In some implementations, the service card 104 may initiate access to services in response to at least a user selecting a graphical element in the GUI 116. In some implementations, the service card 104 may selectively switch the antenna between an on and off state in response to one or more events. The one or more events may include a user request, completion of service access, insertion of card 104 in a different consumer device, location change, timer events, detection of incorrect authentication information entered by the user, change of wireless network that the card 104 is connected to, message received from the service provider 504 using wireless communication methods such as SMS, and/or other events. For example, the service card 104 may receive one or more commands to switch the antenna off from the wireless broadband network 508. In some implementations, the service card 104 may request user identification such as a PIN, a user ID and password combination, biometric signature, and/or others.

In regards to translating between protocols, the service card 104 may process information in, for example, ISO 7816, a standard security protocol, and/or others. In this case, the service card 104 may translate between a wireless broadband protocol and the service-card protocol. In some implementations, ISO 7816 commands may be encapsulated within interface commands used to transmit data between the consumer host device 106 and the card 104. In addition, the service card 104 may interface the consumer device 106 through a physical interface such as MicroSD, Mini-SD SD, MMC, miniMMC, microMMC, USB, miniUSB, microUSB, firewire, Apple iDock, and/or others. In regard to security processes, the service card 104 may implement one or more encryption algorithms to secure information such as a subscriber Identifier (ID) (e.g., subscriber account number), PIN, and/or other security related information. The security related information may include a subscription date, authentication code, user name, password, APN, gateway IP address, X.509 certificates, and/or other user information associated with authenticating an identity of the card holder. In some implementations, the service card 104 may execute private key (symmetric algorithms) such as Data Encryption Standard (DES), Triple DES (TDES), public key (asymmetric algorithms) such as RSA, elliptic curves, access algorithms such as EAP (along with its various flavors like EAP-SIM, EAK-AKA etc), Millenage, COMP128, and/or others. For example, the service card 104 may include one or more encryption keys such as public-private keys. In addition, the service card 104 may include memory (e.g., Flash, EEPROM) including a secured token accessible by the service providers 504 to store access rights of the user. The service card 104 may also store user data, applications, offline Webpages, and/or other information. For example, the service card 104 may include a secure token that identifies content that the user subscribes to or can otherwise access. In addition, the service card 104 may execute or otherwise include digital rights management technology to substantially prevent illegal copying, storing or distributing or other violations of digital rights.

In regards to applications, the service card 104 may execute a locally stored application and present information to and received information from the user through the GUI 116. For example, the service card 104 may execute an application used to automatically upload information stored in the consumer device 106 and/or in the memory of the service card 104 in response to at least a user selecting a graphical element presented in the GUI 116. Alternatively or in addition to applications, the service card 104 may present content (e.g., audio, video) to the user using the GUI 116. In response to initiating foreign-service access, the service card 104 may automatically present an offline Web page through the GUI 116. In some implementations, the offline Web page can be associated with a service provider 504. In some implementations, the service card 104 can be backward compatible and operate as a mass storage device. For example, if the wireless interface of the service card 104 is not available or deactivated, the service card 104 may operate as a mass storage device enabling users to access data stored in the memory component (e.g., Flash). In some implementations, the service card 104 can execute a set of initialization commands in response to at least insertion into the consumer device 106. These initialization commands may include determining device related information for the consumer device 106 (e.g., device ID, device capabilities), determining user relating information (e.g., PIN code, activation code), incrementing counters, setting flags and activating/deactivating functions according to pre-existing rules and/or algorithms.

In some implementations, the service card 104 may automatically execute one or more fraud control processes. For example, the service card 104 may identify an operational change and automatically transmit a notification to the service provider 504 based, at least in part, on the identified change. The service card 104 may execute two fraud control processes: (1) determine a violation of one or more rules; and (2) automatically execute one or more actions in response to at least the violation. In regards to rules, the service card 104 may locally store rules associated with updates to operational aspects of the service card 104. For example, the service card 104 may store a rule indicating a change in consumer host device 106 is an operational violation. In some implementations, the service card 104 may store rules based, at least in part, on updates to one or more of the following: device ID; network APN, gateway IP address, location, 802.1x beacons; and/or other aspects. In response to one or more events matching or otherwise violating rules, the service card 104 may execute one or more processes to substantially prevent or otherwise notify the service provider 504 of potentially unauthorized activity. For example, the service card 104 may execute a command to block an associated user account and/or the service card 104. In some implementations, the service card 104 may execute a command based, at least in part, on an event type. In some examples, the service card 104 may transmit a message to the service provider 504 in response to at least a change in device ID. In some examples, the service card 104 may re-execute an activation process in response to at least a specified event type. An activation process may include activating the service card 104 and/or service account as discussed in more detail with respect to FIG. 6. In some implementations, the service card 104 may execute a command to disconnect the GUI 116 from the service card 104. The service card 104 may present a disconnection notification through the GUI 116 prior to executing the command. In some implementations, the service card 104 may transmit a command to the service provider 504 to deactivate an account associated with the card 104.

In regards to accessing broadband services, the interface between the service card 104 and the access point 212 may be WiMax, $4^{th}$ generation wireless wide area network technologies or other interfaces. In this implementation, the service card 104 may be owned by the Wireless Wide Area Network Operator (WWANO) and personalized to enable the service card 104 access to the WWAN. The actual provisioning data may depend on the security framework of the WWANO and may include a Network identifier (SSID), a connection profile, security data (unique identifiers for the service card 104 with unique keys), WWANO selected authentication algorithm, and/or other aspects of the network 108. The service card 104 may include a temporary user account enabling restricted access to a landing page on the WWANO portal to perform, for example, a sign-up and activation process. Based on the directives defined by the service provider, the service card 104 may be provisioned to bind to the consumer device 106, the network 108, both, or none. For network operator distributed cards, the service card 104 may include antenna modes set to, for example, physical authentication only or physical and user authentication with additional network mutual authentication. For retailer distributed cards, the service card 104 may include antenna modes set to, for example, physical authentication only or physical and user authentication with open access to different WWAN networks. For OEM distributed cards, the service card 104 may include antenna modes set to, for example, physical and user authentication or physical, device and user authentication with open access to different WWAN networks. A user may acquire the WWAN service card 104 when subscribing to the WWANO's broadband data service. Activation of the service card 104 may depend on whether the device 106 includes an interface such as a screen and a keyboard and whether the device is in WWAN coverage. The service card 104 may be activated executing an online activation or offline activation process. Online activation may be executed when the device 106 includes an interface and is in WWAN coverage. Offline activation may be executed when the device 106 is either not in coverage or does not include an interface. In some implementations, the service card 104 may be activate based on the Table 1.

TABLE 1

| Online Activation | Offline Activation |
|---|---|
| When the device is in coverage and has a screen/keyboard, it is assumed capable of connecting to the internet provided a connection is available. In this case, when the card inserts, it performs a plug-in bootstrap and authentication process. Once completed, the plug-in proceeds to perform the network bootstrap and installation process. Once successful, the device may take the user to a landing page on a browser where the user can perform the registration process. | In this case, the user may cradle the host device to the PC that has an internet access and launch the included activation software. This software may take the user to the WWANO landing page to perform the registration process. |

The table is for illustration purposes only. The activation of the service card 104 may include some, all, or different aspects of the chart.

In event the network operator distributes the service card 104 to the user when subscribing to the WWANO's broadband data service, the service card 104 may be configured to perform automatic network bootstrap and request network mutual authentication. In order to perform network bootstrap, the service card 104 may execute a connection manager software. In some implementations, this software can be executed after the installation and the authentication process are complete. The connection manager software may instructs the WWAN modem of the service card 104 (not illustrated) to search for available networks using Network ID information stored in the secure element. If there are no Network IDs profiled in the secure element, the service card 104 may prompt the user to select from available networks using the GUI 116. Once a network is selected, the service card 104 may connect and request an IP address. In response to at least granting access, a browser may be launched through the GUI 116 to display a landing page. If the secure element stores the user's connectivity profile, the connection manager software may attempt to log the user-in to the WWAN network 108. If successful, the user may have access to the internet subject to the provisions of his connectivity profile. If access is restricted or if no user connectivity profile is available for the connected network, the user may be invited to sign up for internet services and provided service options. Once selected, the connectivity profile may be downloaded to the service card 104 for future use. In some implementations, the secure element of the service card 104 may implement the Extensible Authentication Protocol (EAP) protocol to perform network mutual authentication. Other algorithms may also be stored and implemented in order to authenticate the user for connectivity.

In some implementations, the user may access the connection manager software to execute one or more of the following: network access control to select alternate network if multiple options are available; host device control to manage host devices that the plug-in binds to in order to be operational; connectivity profile to configure and request additional services from the WWANO, manager service plan, renew access etc.; access control to control access to the plug-in if multiple family members or friends are using it with different host devices to log to the network; password wallet to store and manage multiple identities for accessing portals on the internet; and/or others. In some implementations, the WWAN service card 104 may share a same common platform as the service card 104 of FIG. 1. In this case, the CPU may operate the flash memory, secure element, the WWAN chipset, the antenna availability, and/or other aspects of the service card 104. The Flash memory may include different partitions such as a protected partition for the connection manager and other WWANO provided applications execute and a user memory. Because of the cryptographic capabilities of the secure element, the user may use encrypted memory where data is only accessible once a user PIN is provided. As previously mentioned, the service card 104 may connect to a SD to USB adaptor for PC or UMPC use.

In some implementations, the service card 104 may provide connectivity services to a small adhoc or nomadic network by functioning as a stand-alone box. In this mode, the service card 104 may connect to a cradle that consists of, for example, a switch, a router (wireless or wired) and a power adapter. The WAN interface may be provided by the service card 104 along with the connection manager capability. The user may be able to place this combined box in different coverage areas and connect different devices simultaneously to the WAN through this router. In some implementations, the WWANO may limit this functionality by either disabling it completely or providing this capability after user signs up for this additional value added capability specifically.

In the WWAN application, the service card 104 may include a secure element OS and a microcontroller OS. The secure element OS may enable network and Internet authentication algorithms based on EAP to be implemented. The secure element OS may structure data in the secure element to allow storage of connectivity profiles, user profiles, network profiles, password valets, host device signatures, allowed antenna modes, and/or other data. The microcontroller OS may be capable of personalizing the secure element by loading/updating connectivity, user and network profiles, and/or other data. In addition, the microcontroller OS may present the service card 104 as a SD Mass Storage to the consumer device 106. The microcontroller OS may partition the memory into a user section and a protected device application section. The device application section may be used to store provider specific applications that either operate from this segment of the memory or are installed on the consumer device 106 from this segment of the memory. In the protected area, the providers 504 may store other value added functions such as VPN clients, VOIP softphones and other applications that may provide valuable applications over the broadband wireless connection. In some implementations, the service card 104 may be used as an identity management token to provide solutions for common internet access risks such as identity theft, phishing, pharming, and/or other attacks. Since the service card 104 may include a tamper proof secure element, the service card 104 may guarantee service providers 504 on the internet that the holder of the service card 104 is an authentic user. Using applications complying industry standard identity management platforms such as Cardspace, Liberty Alliance, openID etc, the service card 104 may integrate into the WWANO's identity management framework.

Service provider 504*a-c* comprises an electronic device (e.g., computing device) operable to provide one or more services to the service card 104. In some implementation, the service provider 504 can provide multimedia content to the service card 104. In some implementations, the service provider 504 may provide remote memory for the consumer host device 106 using the service card 104. The service provider 504 may transmit one or more of the following: serial programs (e.g., television series), movies, news, opinions, education content, training, sports events, Web pages; advanced blogging sites, travel-related content, food and/or cooking content; entertainment; topical movies and/or videos (e.g., surfing, sailing, racing, extreme sports, etc.); political content (e.g., campaigning); adult content; court and/or trail programming; local-government content (e.g., C-SPAN); local programming (e.g., Wayne's World); performing arts (e.g., theater, concerts, music videos, etc.); virtual shopping malls; and/or other content. The provided content may be in any suitable format such as MPEG, streaming and/or others. In the illustrated implementation, the service provider 504 includes an authentication module 124 for authenticating a user prior to providing access to services. For example, the authentication module 124 may transmit a request for information associated with the user such as subscriber ID, device ID, PIN, username and password, and/or other information. Based, at least in part, on information associated with the user information, the authentication module 124 may determine available services, content, level of services, and/or other aspects of the requested foreign service.

The broadband access network 508 facilitates communication between consumer devices 106 and the core network 108. In general, the broadband access network 508 communicates IP packets to transfer voice, video, data, and other suitable information between network addresses. In the case of multimedia sessions, the broadband access network 508 may uses Voice over IP (VoIP) protocols to set up, route, and tear down calls. The consumer devices 106 connect to broadband access network 508 through an access point 114*b*. In general, the broadband access network 508 may include one or more LANs and/or any other communication systems. Users may subscribe to the broadband access network 508, for example, to receive cable television services, DSL or modem internet access using 802.11, wireless microwave broadband internet access (WiMAX), fiber optic cable internet access (FTTC/H Ethernet), wireless personal access networking (WiFi/Bluetooth), digital mobile telephony access (GSM over IP, UMTS over IP) and/or others.

In some implementations, the service card 104 may operate in accordance with one or more of the following modes: active CPE (consumer premises equipment); active router; self train; killed; memory; inactive; and/or other modes. The service card 104 may operate in active CPE mode to present the service card 104 as a consumer premises equipment. In this mode, the service card 104 may authenticate, connect and execute applications access broadband services through the wireless broadband network 508. After the antenna of the service card 104 is activated in this mode, the wireless broadband network 508 may detect the presence of the service card 104. In this mode, the gateway 116 may perceive the service card 104 as a CPE and may communicate with the service card 104 accordingly. In these implementations when the card 104 operates in an active-CPE mode, the access point 114*b* can wirelessly communicate with the service card 104 using the same signals used to communicate with other compatible CPEs. In this implementation, the device 106 may not require additional software to access the services.

In the active-router mode, the service card 104 may convert the device 106 to a wireless router device capable of providing wireless broadband connectivity to other devices when in range of itself. In the event that another device 199 is proximate to device 106, the router mode of the service card 104 may offer connectivity to the device 199 to the services offered by the wireless broadband service provider This mode may only be suitable for devices 199 that have another service card 104 or another embedded capability to connect to the device 106 using peer to peer wireless protocols such as Bluetooth, UWB and Wi-Fi. Once the user authorizes the transmission, the service card 104 in this mode may provide DHCP based IP address to the device 199 and use protocols such as NAT to route IP traffic between the device 199 and the service provider. For example, the device 199 in this mode may receive the same services as the device 106 through the setup of an adhoc personal area network between the two devices.

In regards to the self-train mode, the service card 104 may allow automatic provisioning of the card. In some implementations, the self-train mode can be activated by a special action (e.g., a needle point press to a small switch, entry of an administrative password via the GUI 116). In response to at least activating this mode, the service card 104 may be configured to receive personalization data over, for example, the short range wireless interface from another peer service card. Personalization data received in this mode may include encrypted information that is stored in secured memory of the service card 104. In some implementations, the service card 104 in this mode may receive the information through a wireless interface of a transmitter and/or others. The service card 104 may then synthesize the information that corresponds to the user account and personalize an internal security module that includes, for example, service applications for accessing services from the provider 504 and associated user credentials. The self-train mode may be used to re-personalize the service card 104 in the field. In some implementations, all previous data can be deleted if the self-train mode is activated. The self-train mode may be a peer-to-peer personalization mode where the card 104 may receive personalization information from another service card 104. This mode may represent an additional personalization mode as compared with factory, store and/or Over-The-Air (OTA) personalization scenarios which may be server to client personalization scenarios. In some implementations, the self-train mode may be a peer-to-peer personalization mode where the service card 104 receives personalization information from another service card. Since two service cards 104 are used in this mode, this mode may be different from a server-to-client personalization scenario as with a factory, store, and OTA personalization.

In regards to the inactive mode, the service card 104 may temporarily deactivate the wireless interface. In some implementations, the inactive mode can be activated through the physical interface with the mobile device 106 such as a SD interface. In response to at least the activation of the inactive mode, the service card 104 may temporarily behave as only a mass-memory card. In some implementations, the card 104 may also enter this state when the reset needle point is pressed. In this mode, the service card 104 may preserve locally-stored information including user information. In this mode, the service card 104 may execute the activation process and if successful may return to the active mode. The service provider 504 may use this mode to temporarily prevent usage in response to at least identifying at least potentially fraudulent activity.

In regards to the killed mode, the service card 104 may permanently deactivate the wireless interface. In some implementations, the killed mode is activated through the physical interface with the mobile device 106 such as a SD interface. In response to at least the activation of the killed mode, the service card 104 may permanently behaves as a mass memory stick. In the event that the reset needle point is pressed, the service card 104 may, in some implementations, not be made to enter any other modes. In addition, the service card 104 may delete user information in memory in response to at least this mode being activated. In some implementations, the providers 504 may use this mode to delete data from a service card 104 that is physically lost but still connected to the broadcast network 508.

In regards to the memory mode, the service card 104 may operate as a mass memory stick such that the memory is accessible through conventional methods. In some implementations, the service card 104 may automatically activate this mode in response to at least being removed from the host device, inserted into a non-authorized host device, and/or other events. The service card 104 may be switched to active mode from the memory mode by, for example, inserting the card 104 into an authorized device or may be switched from this mode into the self-train mode to re-personalize the device for a new host device or a new user account. In some implementations, the memory mode may operate substantially same as the inactive mode.

In some implementations, the service card 104 may be re-personalized/updated such as using software device management process and/or a hardware reset. For example, the user may want to re-personalize the service card 104 to change host devices, to have multiple host devices, and/or other reasons. In regards to the software device management, the user may need to cradle the new host device with the service card 104 inserted to launch the software device management application. In some implementations, the software management application can be an application directly installed on a client, integrated as a plug-in to a normal synchronization application such as ActiveSync, available via a browser plug-in running on the plug-in provider's website, and/or other sources. The user may log into the application and verify their identity, and in response to verification, the application may allow access to a devices section in the device management application. The device management application may read the service card 104 and display the MAC addresses, signatures of the devices that he has inserted his plug-in to, and/or other device specific information. The mobile device 106 may be marked as active and the host device may be shown as disallowed or inactive. The application may enable the user to update the status of the new host device, and in response to at least the selection, the device management application may install the signature on the new host device and mark update the status as allowable in secure memory of the service card 104. The user may be able to also update the status of the mobile device 106 to disallowed. Otherwise, both devices may be active and the service card 104 may be switched between the two devices. In regards to the hardware reset process, the use may use the reset needle point press on the physical service card 104 to activate the self-train mode. In this mode, the user data may be deleted and have to be reloaded. When the service card 104 is inserted into the new host device, the provisioning process may begin as discussed above.

In some aspects of operation, the service provider 504 may transmit information to the consumer host device 106 using the service card 104 in response to at least an event. The information may include, for example, service information (e.g., update memory contents of the service card), scripts, applications, Web pages, and/or other information associated with the service provider 504. The event may include completing access to a service, determining a service card 104 is outside the operating range of a wireless broadband network 508, receiving a request from a user of the consumer host device, and/or others. For example, the service provider 504 may identify a consumer host device 106 associated with a card 104 that accessed a service and transmit service information to the service card 104 using the wireless broadband core network 508. In addition or alternatively, the service provider 504 may request information from the consumer host device 106, the service card 104 and/or the user using the wireless broadband core network 508. For example, the service provider 504 may transmit a request for access history to the card 104 through the wireless broadband core network 508.

FIG. 6 is a block diagram illustrating an example service card 104 in accordance with some implementations of the present disclosure. In general, the service card 104 may independently access foreign services using, for example, wireless broadband technology. The service card 104 is for illustration purposes only and may include some, all, or different elements without departing from the scope of the disclosure.

As illustrated, the service card 104 includes an antenna 602, an Antenna Control Function (ACF) module 604, a broadband modem 606, a security module 608, a CPU 610 and memory 612. The antenna 602 wirelessly transmits and receives signals such as wireless broadband radio signals (e.g., GPRS, 802.1x, EV-Dx, LTE, UMB). In some implementations, the AFC module 604 can selectively switch the antenna 602 between an active state and an inactive state in response to at least an event. A switching event may include a user selection through the GUI 116. In some implementations, the switching event may be based, at least in part, on operational aspects of the consumer device 106 such as memory exceeding a predefined threshold. In addition, the ACF module 604 may dynamically adjust the impedance of the antenna 602 to tune the transmit and/or receive frequency. The ACF module 604 may selectively switch the antenna 602 on and off in response to at least a command from the CPU 610. In some implementations, the antenna 602 can be a wide range wireless antenna connected to a wireless broadband chipset via a software switch such as an NAND Gate or other element to allow for code from the CPU 610 to turn the antenna 602 on and off through the ACF module 604.

The broadband modem 606 can include any software, hardware, and/or firmware configured to wirelessly receive and/or transmit signals using the antenna 602. For example, the broadband modem 606 may convert between wireless broadband signals and device interface signals. In some implementations, the broadband modem 606 may translate between a wireless protocol and an interface protocol. For example, the broadband modem 606 may translate between for example, a USB, an interface protocol, and/or others and a wireless broadband protocol (e.g., 802.1x, LTE). In some implementations, ISO 7816 commands may be encapsulated within interface commands used to transmit data between the consumer host device 106 and the card 104. In some implementations, the broadband modem 606 may include a broadband chipset, A/D conversion circuitry, RFIC circuit and/or a connection to the antenna 602.

The security module 608 can include any software, hardware, and/or firmware configured to execute one or more security processes. For example, the security module 608 may authenticate the service card 104 with the service provider 504 through, for example, the wireless broadband core network 108. Prior to authenticating the card 104 with the provider 504, the security module 608 may authenticate one or more aspects of the consumer host device, user, and/or network. In some implementations, the security module 608 may authenticate a user by verifying a physical connection with a user using user information such as biometric information (e.g., fingerprint), a PIN entered by the user, a x.509 type certificate that is unique to the user and stored on the host device, and/or other processes. For example, the security module 608 may compare user information provided through the GUI 116 with user information stored in the local memory 612. Alternatively or in addition, the security module 608 may authenticate the consumer host device 106 by comparing a device signature with a locally-stored certificate. In some implementations, the user can select a PIN or certificate at provisioning time. If this case, the CPU 610 may instantiate a software plug-in on the host device. For example, a software plug-in may request the user for his PIN in real time, read a user certificate installed on the device (e.g., x.509), and/or others. The operation of the software plug-in may be customized by the provider. Regardless, the returned user data may be compared with user data stored in the memory 612. In case of a successful user authentication, the ACF module 604 may activate the antenna 602. In case of an unsuccessful authentication of a certificate and/or user information, the card 104 remains inactive. In case of unsuccessful PIN match, the user may be requested to repeat PIN attempts until a successful match or the number of attempts exceeds a threshold. The card provider may customize the attempt threshold.

In regards to network authentication, the security module 608 may request network authentication prior to activation.

For example, the security module 608 may be distributed by a Wireless Network Operator (WNO) that requires a network authentication. In this example, a flag in memory may be set to ON indicating that network authentication is required. If the flag is set to ON, the security module 608 may temporarily activate the antenna 602 using the ACF module 604. A unique identity about the allowed network may be locally stored in memory such a Service Set IDentifier (SSID), APN ID, gateway ID, DNS addresses for broadband networks, and/or identifiers. If this flag is ON, the security module 608 may transmit requests for network details to, for example, al available wireless networks in range. In some cases, the type of unique network identity employed and the method to deduce it from the host device may be variable and dependent on the network provider and capability of the host device. If the locally-stored ID matches the ID of any available wireless network, the security module may begin an online authentication process by negotiating subscription rights with the servicing access point. In this case, the user's subscription parameters such as subscription ID, user profile, security keys, username and password may be sent to the provider using the wireless broadband network. When the user is successfully authenticated, the service card may receive access and may be assigned an IP address to connect to the wireless broadband network. In this case, the antenna may remain active to enable access to foreign services. If the online authentication fails, the antenna may be turned off and access to remote services may be denied. The security module 608 may include a security module OS provided by the security module vendor and may be compliant with service-provider specifications. The security module OS may structure the data in the security module 608 to be compliant with provider specifications or any other available specifications. In addition, the security module 608 may store user subscription parameters, host device signatures, service networks information and allow modes of the antenna 602.

In some implementations, the security module 608 may implement one or more encryption algorithms to secure information such as a subscriber Identifier (ID) (e.g., subscriber account number), PIN, and/or other security related information and may execute online authentication to the servicing network. The security related information may include a subscription date, authentication code, user name, user ID, password, subscription ID, user profile and/or other user information associated with authenticating the identity and/or privileges of the card holder. In some implementations, the service card 104 may execute private key (symmetric algorithms) such as Data Encryption Standard (DES), Triple DES (TDES) and/or others or public key (asymmetric algorithms) such as RSA, elliptic curves, broadband authentication algorithms such as EAP, Milenage and/or others. For example, the service card 104 may include one or more encryption keys such as public-private keys. In some implementations, the security module 608 may include or otherwise operate as a Subscriber Identity Module (SIM) card. In this case, the SIM card may encrypt and decrypt data transmissions and store data about a specific user so that the user can be identified and authenticated to wireless broadband core network 108. In some embodiments, the SIM card may execute a Universal Subscriber Identity Module (USIM). In general, the SIM card may securely store the key identifying a mobile phone service subscriber, as well as subscription information, preferences, text messages and/or other information. In addition to storing authentication information, the SIM card may store network state information such as the location area identity (LAI). In short, the SIM card may contain the authentication key to access subscriber services in the wireless broadband core network 108. In some implementations, rather than a SIM, the security module may process authorization information using a EAP for accessing the access point 114b, a removable user-identity module (R-UIM) for accessing EV-DV networks, or any other secure storage device capable of communicating subscriber information to wireless broadband core network 108. During the authentication transaction process, the security module 608 may perform encryption algorithms for sharing authentication information with the gateway 116. While illustrated as separate elements, the security module 608 and the broadband modem 606 may be a single element. In this example, the broadband modem 606 and the security module 608 may execute one or more of the following: format signals for wireless communication in accordance with one or more formats; decrypt received messages and encrypt transmitted messages; authenticate user credentials locally stored in the memory 612 with the security network; acquire an IP address for connectivity from the servicing access point, execute DHCP services for other local devices; execute peer to peer connection with other local device; implement NAT to route traffic between the servicing network and other local devices; and/or other processes.

The CPU 610 can include any software, hardware, and/or firmware that manages operational aspects of the card 104 independent of the consumer host device 106. For example, the CPU 610 may include a runtime environment for executing broadband applications for accessing foreign services using broadband signals. In some implementations, the CPU 610 may execute one or more of the following: interfacing the consumer host device 106 such as translating between protocols; determining operational aspects of the consumer host device 106; transmitting commands to the consumer host device 106 to substantially control one or more hardware components (e.g., GUI 116, memory); identifying events associated with activating and deactivating the antenna 602; executing broadband applications that accesses foreign services from the provider 504; retrieve data from the host device; provide data to the host device; and/or others. In some implementations, the CPU 610 may transmit to the ACF module 604 switching commands in response to an event such as a user request, completion of a transaction, and/or others. In some implementations, the CPU 610 may switch the antenna 602 between active and inactivate mode using the ACF module 604 based, at least in part, on a personalization parameter defined by, for example, a user, distributor (e.g., service provider), and/or others. For example, the CPU 610 may activate the antenna 602 when the service card 104 is physically connected to a host device and when a handshake with the host device is successfully executed. In some implementations, the CPU 610 may automatically deactivate the antenna 602 when the service card 104 is removed from the host device. In some implementations, the antenna 602 is always active such that the service card 104 may be used as a stand-alone access device (e.g., device on a keychain). In regards to the handshaking process, the CPU 610 may execute one or more authentication processes prior to activating the service card 104 and/or antenna 602 as illustrated in FIG. 7. For example, the CPU 610 may execute a physical authentication, a device authentication, a network authentication, and/or a user authentication. For example, the CPU 610 may activate the antenna 602 in response to at least detecting a connection to the physical interface with the host device (e.g., SD interface) and successful installation of the device driver for mass memory access (e.g., SD device driver) on the host device. In some implementations, device authentication may include physical authentication in addition to a signature comparison of a device signature stored in memory 612 that was created during first-use (provisioning) to a run-time signature calculated using, for example, a unique parameter of the host device 106. In the event no host device signature exists in the memory 612, the CPU 610 may bind with the first compatible host device 106 that the card 104 is inserted into. A compatible host device 106 may be a device that can successfully accomplish physical authentication successfully. If a host-device signature is present in the memory 612, the CPU 610 may compare the stored signature with the real-time signature of the current host device 106. If the signatures match, the CPU 610 may proceed to complete the bootstrap operation. If the signatures do not match, host device 106 may be rejected, bootstrap is aborted and the card 104 may be returned to the mode it was before being inserted into the device.

The memory 612 may include a secure and non-secured section. In this implementation, the secure memory 612 may store one or more user credentials that are not accessible by the user. In addition, the memory 612 may store offline Web pages, applications, service history, and/or other data. In some implementations, the memory 612 may include Flash memory from 64 MB to 32 GB. In addition, the memory 612 may be partitioned into user memory and device application memory. The memory 612 may store signatures of allowed host devices and/or antenna modes. In some implementations, the memory 612 may include secure portions designed to be accessible only by the service provider.

FIG. 7 illustrates is a block diagram illustrating an example CPU 610 of FIG. 6 in accordance with some implementations of the present disclosure. In general, the CPU 610 includes personalized modules that access foreign services independent of the consumer device 106. The illustrated CPU 610 is for example purposes only, and the CPU 610 may include some, all or different modules without departing from the scope of this disclosure.

In some implementations, the service card 104 can include a host controller 702, a real-time framework 704, a broadband application 706, a real-time OS 708, a high speed IP interface 710, a memory controller 712, and a security-module driver 714. In some implementations, the host controller 702 includes an interface layer, an API/UI layer, a Web server, and/or other elements associated with the consumer host device 106. The host controller 702 includes an interface to the host device, i.e., physical connection. In regards to the physical interface, the host controller 702 may physically interface the consumer device 106 using an SD protocol such as MicroSD, Mini-SD or SD (full-size). In some implementations, the physical interface may include a converter/adapter to convert between two different protocols based, at least in part, on the consumer device 106. In some implementations, the consumer device 106 may communicate using protocols such as USB, MMC, Firewire, iPhone proprietary interface, and/or others. In addition, the host controller 702 can include any software, hardware, and/or firmware that operates as an API between the consumer device 106 and the service card 104. Prior to accessing services, the service card 104 may automatically install drivers in the consumer device 106 in response to at least insertion. For example, the service card 104 may automatically install a SD device driver in the device 106 to enable the service card 104 to interface the consumer device 106. In some implementations, the service card 104 may install an enhanced device driver such as a Mass Memory with Radio (MMR) API. In this implementation, the interface can drive a class of plug-ins that contain mass memory as well as a radio interface. The MMR API may execute one or more of the following: connect/disconnect to/from the MMR controller (Microcontroller in the plug-in); transfer data using MM protocol (e.g., SD, MMC, XD, USB, Firewire); send encrypted data to the MMR controller; receive Acknowledgement of Success or Error; received status word indicating description of error; turn radio on/off; send instruction to the service card 104 to turn the antenna on with specifying the mode of operation (e.g., sending mode, listening mode); transmit data such as send instruction to controller to transmit data via the radio; listen for data such as send instruction to controller to listen for data; read data such as send instruction to controller to send the data received by the listening radio; and/or others. In some implementations, MMR can be compliant with TCP/IP. In some implementations, API encapsulated ISO 7816 commands may be processed by the security module in addition to other commands.

In some implementations, host controller 702 can operate in accordance with the two processes: (1) the service card 104 as the master and the consumer device 106 as the slave; and (2) the card UI as the master. In the first process, the host controller 702 may pass one or more commands to the consumer device 106 in response to, for example, insertion of the service card 104 into a slot in the consumer device 106, a request from the GUI 116, and/or other events. In some implementations, the host controller 702 can request the consumer device 106 to execute one or more of following functions: Get User Input; Get Signature; Display Data; Send Data; Receive Data; and/or others. The Get User Input command may present a request through the GUI 116 for data from the user. In some implementations, the Get User Input may present a request for multiple data inputs. The data inputs may be any suitable format such as numeric, alphanumeric, and/or other strings of characters. The Get Signature command may request the consumer device 106 to return identification data such as, for example, a phone number, a device ID like an IMEI code or a MAC address, a network code, a subscription ID like the SIM card number, a connection status, location information, Wi-Fi beacons, GPS data, and/or other device specific information. The Display Data command may present a dialog to the user through the GUI 116. In some implementations, the dialog can disappear after a period of time, a user selection, and/or other event. The Send Data command may request the consumer device 106 to transmit packet data using its own connection to the external world (e.g., SMS, wireless broadband, Wi-Fi). The Receive Data command may request the consumer device 106 to open a connection channel with certain parameters and identify data received through the connection. In some implementations, the command can request the consumer device 106 to forward any data (e.g., SMS) satisfying certain criteria to be forwarded to the service card 104.

In regards to the UI as master, the host controller 702 may execute one or more of the following commands: security module Command/Response; Activate/Deactivate; Flash Memory Read/Write; Send Data with or without encryption; Receive Data with or without decryption; URL Get Data/URL Post Data; and/or others. The security module commands may relate to security functions provided by the card and are directed towards the security module within the service card 104 (e.g., standard ISO 7816 command, proprietary commands). In some implementations, the commands may include encryption, authentication, provisioning of data, creation of security domains, update of security domain, update of user credentials after verification of key, and/or others. In some implementations, the commands may include non security related smart card commands such as, for example, read service history commands. The read service history command may perform a read of the memory 512 of the service card 104. In some implementations, certain flags or areas of the memory 612 may be written to after security verification. The Activate/Deactivate command may activate or deactivate certain functions of the service card 104. The Flash Memory Read/Write command may execute a read/write operation on a specified area of the memory 612. The Send Data with or without encryption command may instruct the service card 104 to transmit data using its wireless connection with, for example, the access point 114b. In addition, the data may be encrypted by the service card 104 prior to transmission using, for example, keys and encryption capability stored within the security module 608. The Receive Data with or without decryption command may instruct the service card 104 to switch to listening mode to receive data from its wireless connection with the wireless broadband core network 108. In some implementations, data decryption can be requested by the security module using, for example, keys and decryption algorithms available on the security module, i.e., on-board decryption. The URL Get Data/URL Post Data command may instruct the host controller 702 to return pages as per offline get or post instructions using, for example, offline URLs.

In some implementations, the host controller 702 may assign or otherwise associate URL style addressing to certain files stored in the memory 612 (e.g., flash) of the service card 104. In some implementations, the host controller 702 can locate a file using the URL and returns the file to the GUI 116 using standard HTTP, HTTPS style transfer. In some implementations, the definition of the files can be formatted using standard HTML, XHTML, WML and/or XML style languages. The file may include links that point to additional offline storage locations in the memory 612 and/or Internet sites that the card 104 may access. In some implementations, the host controller 702 may support security protocols such as SSL. The host controller 702 may transfer an application in memory 612 to the consumer device 106 for installation and execution. The host controller 702 may request the capabilities of the browser on the device 106 using, for example, the browser user agent profile, in order to customize the offline Web page according to the supported capabilities of the device and the browser, such as, for example, supported markup language, screen size, resolution, colors and such.

As part of the Real time OS, the real-time framework 704 may execute one or more functions based, at least in part, on one or more periods of time. For example, the real-time framework 704 may enable an internal clock available on the CPU 610 to provide timestamps in response to at least requested events. The real-time framework 704 may allow certain tasks to be pre-scheduled such that the tasks are executed in response to at least certain time and/or event based triggers. In some implementations, the real-time framework 704 may allow the CPU 610 to insert delays in certain transactions. In some implementation, a part of WAP standards called WTAI (Wireless Telephoney Application Interface) can be implemented to allow offline browser pages on the card 104 to make use of functions offered by the consumer device 106.

The broadband application 706 can include any software, hardware, and/or firmware that access broadband services. For example, the broadband application 706 may generate a request to access broadband services by selecting, extracting or otherwise including user credentials. In some implementations, the high speed IP interface 710 may execute one or more of the following: transmit properties of the service card 104 in response to at least an identification request received from the access point 114 and/or the access point 114b; receive a request to authenticate the card 104 from, for example, the access point 114b; identify user credentials in the memory 612 in response to at least the request; generate an access response based, at least in part, on the user credentials; transmit the access response to the access point 114b and/or access point 114 using, for example, a high speed IP interface 710; receive clear data, for example a random number, from the access point 114b and/or access point 114 and provide a response containing encrypted data by encrypting the clear data using the cryptographic capabilities of the security module 608; transmit the encrypted data using the high speed IP interface 710; increment an access counter with every access request received; transmit a value of the access counter in response to a request from the access point 114b and/or access point 114; execute differential calculation of the contents of the mass memory from the moment of previous similar calculation; and/or other processes. In generating the authentication response, the broadband application 706 may generate the response in a format specified by the wireless broadband network 108. The authentication request may include one or more of the following: user credentials; subscription ID, user profile, user certificate; username and password; and/or other card or user information. In some implementations, the broadband application 706 can automatically transmit user information stored in the mobile user device 106 such as images, video, documents, and/or other information. In these cases, the broadband application 706 may effectively augment the memory of the consumer device 106 with remote memory in the service provider 504. In some implementations, the broadband application 706 may access content stored by the service provider 504 and present the media through the GUI 116 of the consumer host device 106. In these case, the broadband application 706 may present media through the GUI 116 that is otherwise not accessible by the consumer host device 106. The broadband application 706 may include a VOIP softphone, a Media Player capable of playing streaming video, and/or others.

The real-time OS 708 may execute or otherwise include one or more of the following: real-time framework 704; a host process that implements the physical interface between the transaction-card CPU and the consumer device 106; an interface that implements the physical interface between the transaction-card CPU and the security module; a memory-management process that implements the ISO 7816 physical interface between the transaction-card CPU and the security module; an application-layer process that implements the API and UI capabilities; the ACF module 604; power management; and/or others. In some implementations, the real-time OS 708 may manage the physical interface between the transaction-card CPU and the memory 612 that includes memory segmentation to allow certain memory areas to be restricted access and/or data buffers/pipes. In some implementations, the CPU 210 may include a separate memory controller 712 for managing the local memory 612. In some implementations, the real-time OS 708 may include a microcontroller OS configured to personalizing the security module 608 such as by, for example, converting raw data (subscription ID, user ID, password, user certification, DRM certificates, user profiles) into secure encrypted information. In addition, the microcontroller OS may present the card 104 as a SD mass storage to the host device 106. The microcontroller OS may partition the memory 612 into a user section and a protected device application section. In this example, the device application section may be used to store provider specific applications that either operate from this segment of the memory or are installed on the host device 106 from this segment of the memory.

The broadband chipset 318 may provide the hardware protocol implementation and/or drivers for RF communication such as wireless broadband communication. For example, the broadband chipset 318 may include on-board wireless broadband circuitry to interface with the access point 114b using a wireless/wireless connection. The wireless connection may be, for example, client to node (access point/gateway/base station), peer to peer (another service card 104) or node to client (router to other devices).

FIG. 8 is a schematic diagram 800 of personalization of a intelligent card (e.g., the service card 104, the service card 104). In particular, the intelligent card may be personalized prior to being issued to a user, i.e., pre-issuance, or after being issued to a user, i.e., post-issuance. In regards to pre-issuance, intelligent cards may be personalized in mass batches at, for example, a factory. In this example, each intelligent card may be loaded with user credentials, security framework, applications, offline Web pages, and/or other data. In some implementations, a intelligent card may be personalized individually at, for example, a service branch. In this case, a intelligent card may be individually loaded with data associated with a user after, for example, purchasing the card. As for post issuance, the intelligent card may be personalized wirelessly. For example, the service card 104 may be personalized through a wireless broadband connection established using the consumer device 106. In some implementations, an intelligent card may be personalized by synchronizing with a computer such as a client. The service card 104 may receive from an enterprise at least associated with the service provider 504 that personalization data prior to activation including user credentials, broadband application and at least one of operational flags, rule table or user interface. The personalization data present in the card may be updated after activation using at least one of the following methods: wireless or over the air messages containing special and secure update instructions; internet or client application running on a PC connected to the service card 104 via the host device or a card reader; internet application wirelessly connecting to the service card 104 via the host consumer device or user interface application of the service card 104 itself; and/or other methods.

In some implementations, provisioning of the intelligent card can be based, at least in part, on the distribution entity (e.g., service provider, wireless operator, user). For example, the intelligent card may be distributed by a service provider such as a wireless provider. In this case, the intelligent card may be activated in response to at least initial insertion into a host device. The antenna mode may be set to physical authentication only by default. In some examples, the user may self-select a PIN authentication to prevent unauthorized use or through a PC cradle and plug-in management software if the host device does not have a screen and keyboard. In the wireless-operator implementation, the intelligent card may require device authentication before activation. In some examples, the user may provision service data (e.g., subscription information) using one of several methods. In addition, the user may add user authentication and network authentication. In the user-provided implementation, the user may acquire the intelligent card from, for example, a retail store or other channels like OEM host device manufacturers. In this case, the user may activate the card in a plurality of different devices with provider selected provisioning.

In regards to activating for service transactions, the intelligent card may be configured in memory mode when user acquires the card from, for example a wireless operator, a third-party provider, and/or others. Activation of the card may include the following two levels: 1) physically, specifying antenna availability under a specific set of circumstances desired by the provider; and b) logically, at the service provider signifying activation of the service vehicle carried on the card. In some implementations, activation may be based, at least in part on device distributor, antenna availability selection, and/or type of host device as illustrated in Table 2 below.

TABLE 2

| Plug-in Seller and Mode of distribution | Plug-In Initial State and Antenna Availability Choice | Device Has No Screen/ Keyboard | Device Has Screen & keyboard |
|---|---|---|---|
| Service provider (wireless operator) ships plug-in directly to the subscriber or through participating resellers/distributors etc. | Plug-In is in Memory Mode, It is fully personalized with user's account information and Antenna mode is set to Physical Authentication | Manual: User has to call service provider's number to activate his account, the Device can only work with a single account. User can also access service provider's site on the internet using another PC to activate his account | If the device is capable of wireless access, upon insertion, the plug-in spawns a web page and takes the user to service provider's website. The user self activates his account by entering his account number and matching registration information (initial password). The user can also optionally select a PIN (change Antenna availability to user authentication) at the same time. If Internet connection is not available, the device can automatically dial a voice call to service provider's number for account activation. If wireless connection is not available as well (device is only a PDA), the user has to fallback to manual activation (see left) |
| WNO: Wireless Network Operator | Plug-In is in Memory Mode, it is | Not Applicable | Assumption: Device has functional wireless |

TABLE 2-continued

| Plug-in Seller and Mode of distribution | Plug-In Initial State and Antenna Availability Choice | Device Has No Screen/ Keyboard | Device Has Screen & keyboard |
|---|---|---|---|
| Ships plug-in as an accessory with an advice for compatible devices, User can select his preferred host device and attempt to operate his plug-in with, to avail of the service | unpersonalized. Antenna Availability is set to Network authentication is set to On. Plug-In will bind to first device it is inserted in and where network authentication is successful | | connection. Plug-In will spawn an internet connection to the operator portal and the connection management application will be downloaded upon user confirmation. User can reject download and choose to manually provision service provider data by going to a third party service provider or directly to the service provider website. Plug-In is bound to the device and to the network provider's network. If the same device is unlocked and used on another network, the plug-in will cease to operate and will revert back to memory mode. When removed from the device, the plug-in will revert to the memory mode. |
| OEM 1: Cellphone manufacturer | Device Authentication (device comes bundled with a cellphone) | Not Applicable | Option A: Device Manufacturer offers a connection management application, rest of the process remains as above Option B: Wireless Operator offers a connection management application. User goes to the wireless operator portal and downloads this application Over the Air. The rest of the process then remains the same as above Option C: User navigates to a third party connection management application (example paypal or Google). Sign up is offered to participating service provider and applications are personalized on the plug-in Over the Internet Option D: User navigates to service provider's website and activates a new account which is personalized over the Internet on the plug-in |
| OEM 2: Other manufacturer | Device Authentication | User has to cradle the device to the PC with an internet connection and sign-up on the PC by going to an service provider's website directly. Account is downloaded over the internet via the cradle and then the device is activated. In this process, the plug-in is bound to the device signature. When removed from the host device, the antenna turns off When plugged into another device, the device signature fails and the device behaves | If the device has wireless connection (it is a wireless PDA): Same as above If the device has no wireless connection (it is an unconnected PDA): Same as left |

TABLE 2-continued

| Plug-in Seller and Mode of distribution | Plug-In Initial State and Antenna Availability Choice | Device Has No Screen/ Keyboard | Device Has Screen & keyboard |
|---|---|---|---|
| | | like a mass memory device only | |

The illustrated chart is for example purposes only. The user may activate an intelligent card using the same, some, or different processes without departing from the scope of this disclosure.

Figure 9A:
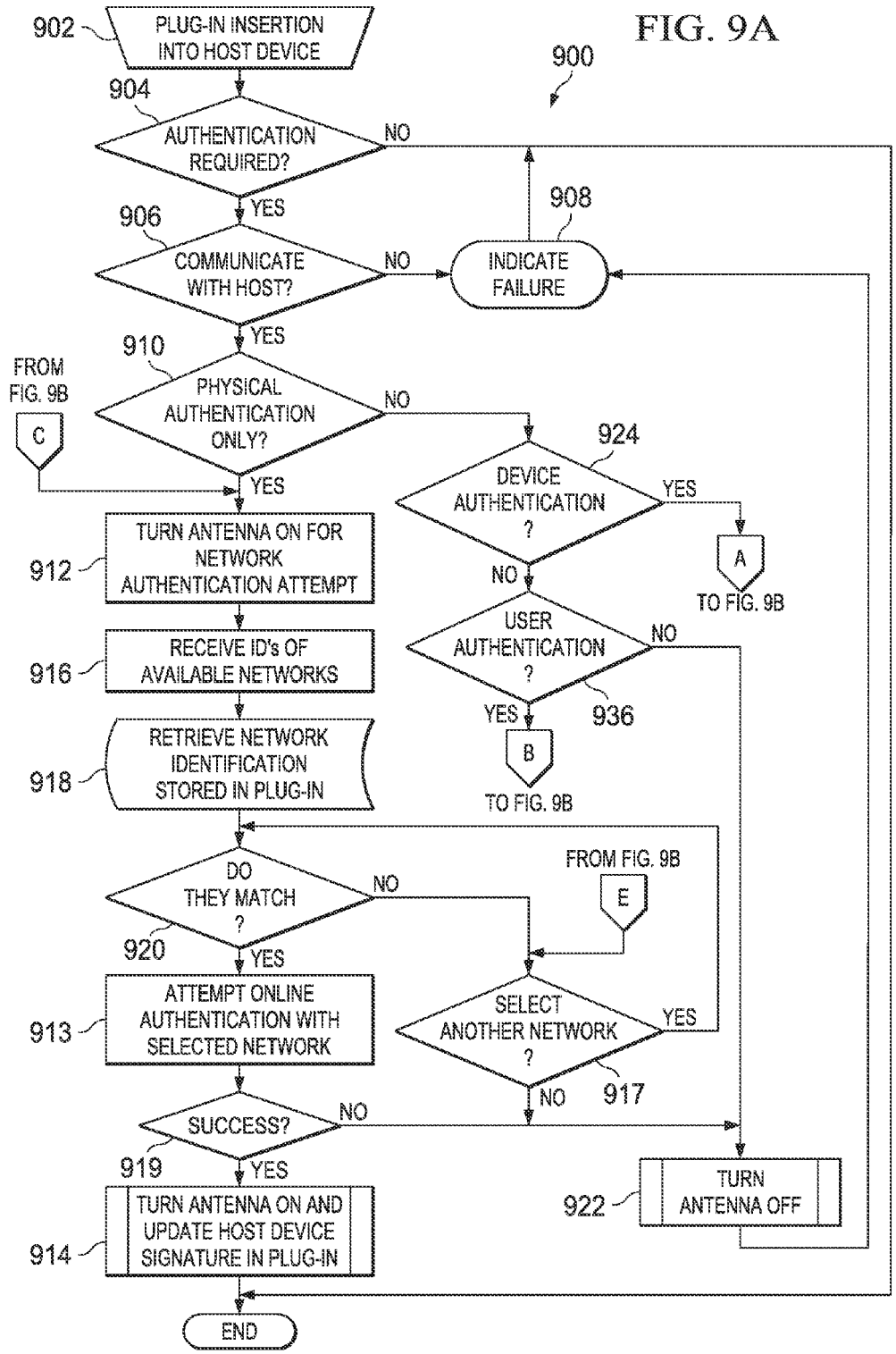
FIG. 9A and 9B are flow charts illustrating an example method for initialize an intelligent card.
Figure 9B:
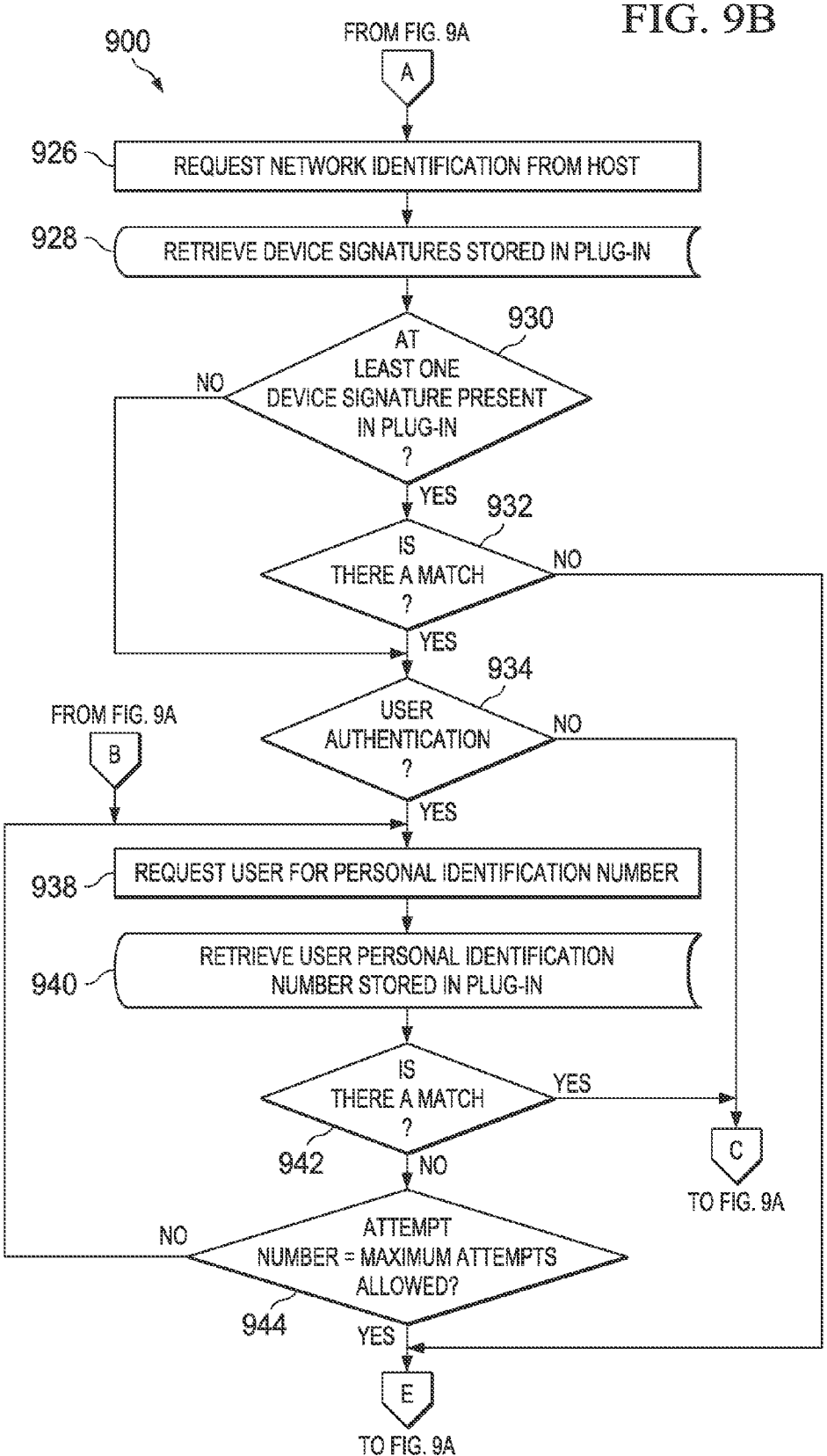

FIG. 9 is a flow chart illustrating an example method 900 for automatically bootstrapping an intelligent card in response to at least insertion into a host device. In general, an intelligent card may execute one or more authentication procedures prior to activation. Many of the steps in this flowchart may take place simultaneously and/or in different orders as shown. System 100 may use methods with additional steps, fewer steps, and/or different steps, so long as the methods remain appropriate.

Method 900 begins at step 902 where insertion into a host device is detected. For example, the service card 104 may detect insertion into the consumer device 106. If authentication is not required for any aspect of the intelligent card at decisional step 904, then execution ends. If authentication is required for at least one aspect, then execution proceeds to decisional step 906. If communication with the host device includes one or more errors, then, at step 108, a failure is indicated to the user. In the example, the service card 104 may present an indication of a communication error to the user using the GUI 116. If a communication error is not detected at decisional step 906, then execution proceeds to decisional step 910. In some implementations, the intelligent card uploads an SD driver to the host device. If the intelligent card only requires physical authentication, then execution proceeds to step 912. The antenna is turned temporarily on to attempt network authentication at step 912. As for the example, the service card 104 may activate the antenna for wireless transactions and update local memory with the host-device signature. At step 916, the intelligent card transmits a request for all available network IDs that are within range. Next, at step 918, the intelligent card retrieves a locally-stored network ID. If the stored network ID matches with one of network IDs retrieved at decisional step 920, then the card performs online authentication with the service provider by transmitting user credentials using an authentication protocol as specified by the service provider at step 913. If this online authentication is successful ad decisional step, the card is activated at step 914. If not successful, then execution proceeds to decisional step 917. If another network is selected, then execution returns to decisional step 920. If another network is not selected, then the antenna is deactivated at step 922.

Returning to decisional step 910, if the authentication is not only physical authentication, then execution proceeds to decisional step 924. If the authentication process includes device authentication, then, at step 926, the intelligent card transmits a request for a device ID to the host device. At step 928, the intelligent card retrieves a locally stored device signatures. If the intelligent card does not include at least one device signature, then execution proceeds to decisional step 934. If the intelligent card includes one or more device signatures, then execution proceeds to decisional step 932. If one of the device signatures matches the request device ID, then execution proceeds to decisional step 934. If the signatures and the request device ID do not match, then execution proceeds to step 922 for deactivation. If user authentication is not included in the authentication process, then execution proceeds to decisional step 912 for physical authentication. If user authentication is included at decisional step 934, then execution proceeds to step 938.

Returning to decisional step 924, if the authentication process does not include device authentication, then execution proceeds to decisional step 936. If user authentication is not included in the process, then, at step 922, the intelligent card is turned off. If user authentication is included, then, at step 938, the intelligent card request a PIN number from the user using the host device. While the user authentication is described with respect to entering a PIN through the consumer host device, the user may be authenticated using other information such as biometric information (e.g., fingerprint). Again returning to the example, the service card 104 may present a request for the user to enter a PIN through the GUI 116. At step 940, the intelligent card retrieves a locally-stored PIN. If the request PIN and stored PIN match at decisional step 942, then execution proceeds to decisional step 912 for physical authentication. If the request PIN and the stored PIN do not match at decisional step 942, then execution proceeds to decisional step 944. If the number of attempts have not exceeded a specified threshold, then execution returns to step 938. If the number of attempts has exceed to the threshold, then the antenna is deactivated at step 922. In the example, if the event that the service card 104 fails to authorize the device, network and/or user, the service card 104 may wirelessly transmit an indication to the associated service provider using the broadband technology of the consumer host device 106. In this case, the illustrated method 900 may be implemented as a fraud control process to substantially prevent unauthorized use of the service card 104.

Figure 10:
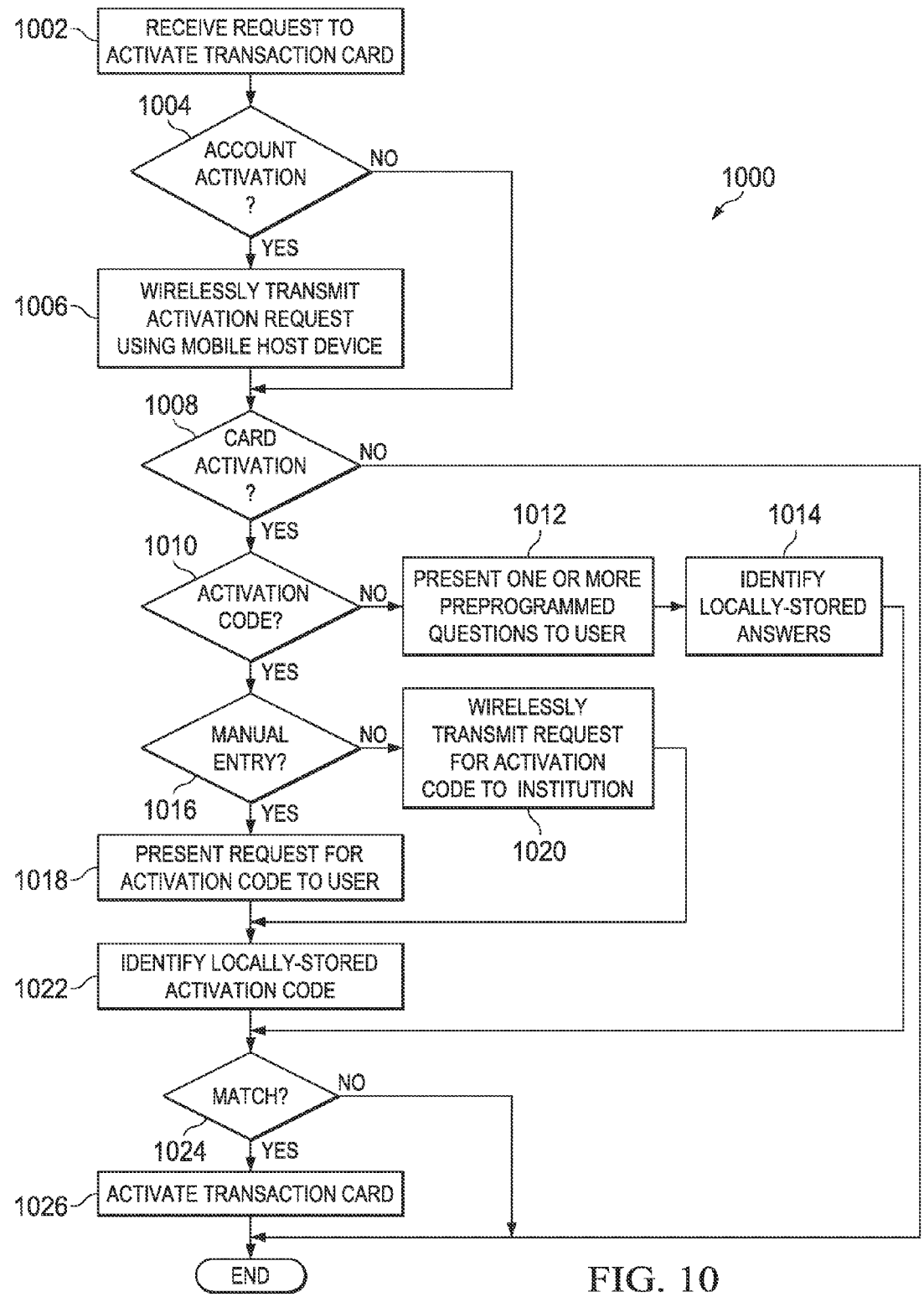
FIG. 10 is a flow chart illustrating an example method for activating a service card.

FIG. 10 is a flow chart illustrating an example method 1000 for activating a wireless transaction system including an intelligent card. In general, an intelligent card may execute one or more activation processes in response to, for example, a selection from a user. Many of the steps in this flowchart may take place simultaneously and/or in different orders as shown. System 500 may use methods with additional steps, fewer steps, and/or different steps, so long as the methods remain appropriate.

Method 1000 begins at step 1002 where a request to activate a service card is received. For example, the user may select a graphical element displayed through the GUI 116 of a consumer host device 106 in FIG. 5. If an account activation is included at decisional step 1004, then at step 1006, a request to activate the associated service account is wirelessly transmitted to service provider. For example, the service card 104 of FIG. 5 may wireless transmit an activation request to the service provider 504. If an account activation is not included, then execution proceeds to decisional step 1008. If card activation is not included, then execution ends. If card activation is included, then execution proceeds to decisional step 1010. If an activation code is not included, then at step 1012, one or more preprogrammed questions are presented to the user using the GUI of the host device. Returning to the initial example, the service card 104 may identify locally stored questions and present the questions to the user using the GUI 116 of the consumer host device 106. At step 1014, locally-stored answers to the programmed questions are identified. Returning to decisional step 1010, if an activation code is included, then execution proceeds to decisional step 1016. If the activation code is manually entered by the user, then at step 1018, a request for the activation code is presented to the user through the GUI of the consumer host device. In the initial example, the service card 104 may present a request for an activation code such as a string of characters to the user through the GUI 116 of the consumer host device 106. If the activation code is not manually entered by the user, then at step 1020, the service card wirelessly transmits a request for the activation code using the broadband technology of the host device. In the wireless broadband example, the service card 104 may transmit a request to the service provider using the wireless broadband core network 108. In either case, the locally-stored activation code is identified at step 1022. If the locally stored information matches the provided information at decisional step 1024, then at step 1026, the service card is activated. For example, the service card 104 may activate in response to at least a user entering a matching activation code through the GUI 116. If the provided information does not match the locally stored information, then execution ends.

Figure 11A:
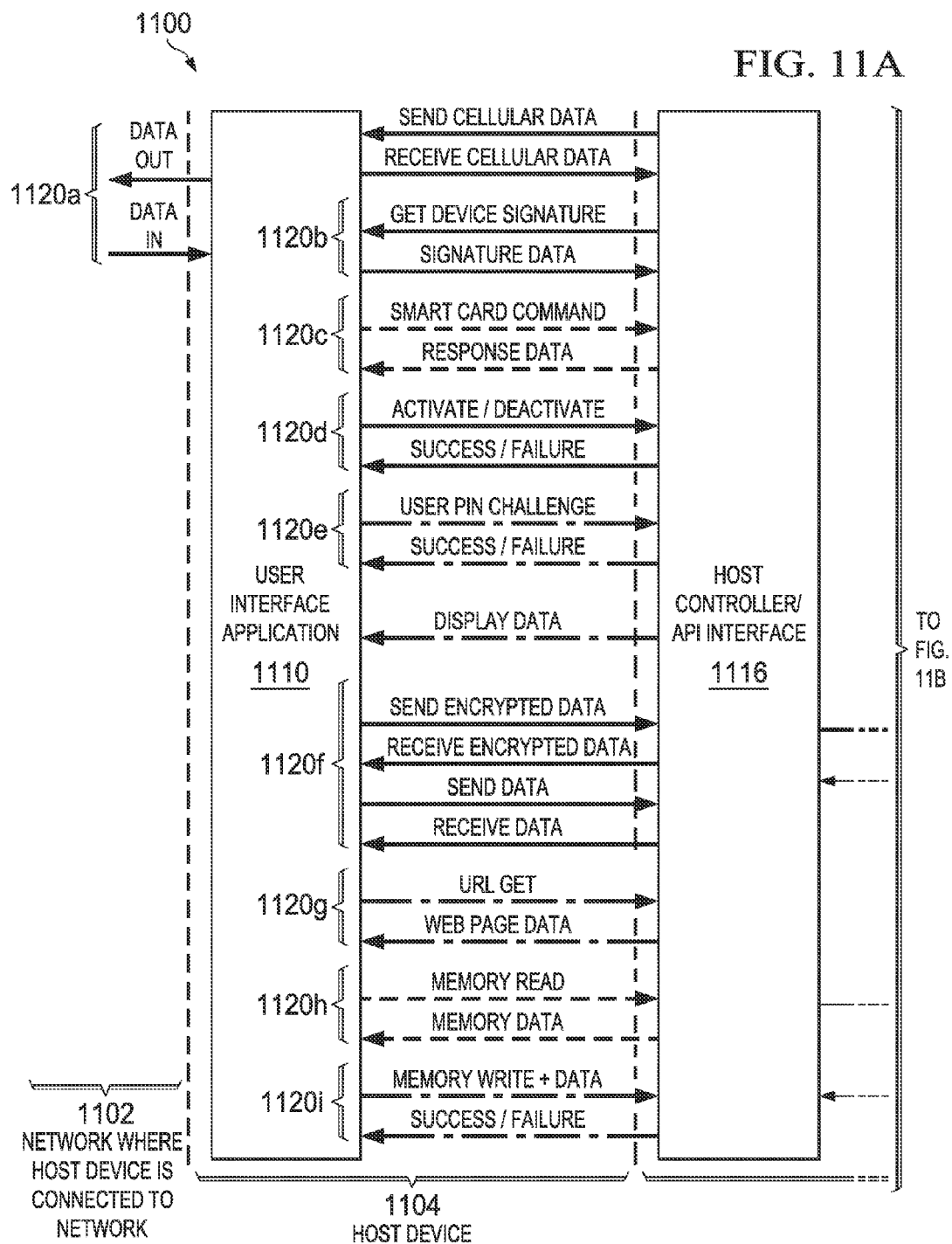

FIGS. 11A-C is an example call flow 1100 in accordance with some implementations of the present disclosure. As illustrated, the flow 1100 includes a network 1102, a host device 1104, an intelligent card 1106, and a wireless broadband network 1108. The host device 1104 is configured to communicate with the network 1102 and includes a slot for insertion of the intelligent card 1106. The intelligent card 1106 is configured to transmit commands to and receive data from a user interface application 1110 executed by the host device 1110 and execute access foreign services independent of the host device 1110. The card 1106 includes a CPU 1112 for accessing services and a wireless chipset 1114 for communicating with the wireless broadband network 1108. The CPU 1112 executes a host controller/API interface 1116 configured to transmits commands in a form compatible with the host device 1104 and convert data from the host device 1104 to a form compatible with the CPU 1112. In some implementations, the SIM 1122 may include a personalization engine, a credentials database, cryptographic engine and a smart-card interface.

As illustrated, the flow 1100 may include multiple sessions 1120 between the host device 1104 and the card 1106 and between the card 1106 and the wireless broadband network 1108. The session 1120*a* illustrates a session managed by the card 1106 using the network capabilities of the host device 1110. In this example, the card 1106 transmits data for transmission through a network connected to the host device 1104, and after receiving the data, the host device 1104 transmits the data to the network 802. In response to receiving data from the network 1102, the host device 1104 may automatically transmit the received data to the card 1106. In some implementations, the card 1106 may transmit a request for a device signature to the host device 1104 as illustrated in session 1120*b*. For example, the card 1106 may request the device signature during a bootstrapping process. The session 1120*c* illustrates that a user may submit commands to the card 1106 through the interface of the host device 1104. For example, the user may request that the card display the user's service history through the interface of the host device 1104.

In some implementations, the card 1106 may receive a command to activate or deactivate the antenna through the host device 1104 as illustrated in session 1120*d*. For example, a service provider may identify irregular transactions and transmit a command through the network 1102 to deactivate the card 1106. The card 1106 may authorize a user by requesting a PIN using the host device 1104. As illustrated in session 1120*e*, the user may submit a PIN to the card 1106 using the interface of the host device 1104, and in response to an evaluation of the submitted PIN, the card 1106 may present through the host device 1104 an indication that the user verification is successful or has failed. In some implementations, the card 1106 may receive and transmit encrypted data between the host device and/or network 1108 as as illustrated in session 1120*f* and 1120*m*. In some implementations, the user may present offline Web pages stored in the card 1106 as illustrated in session 1120. For example, the card 1106 may receive a request to present an offline Web page from the user using the host device 1104 and present the offline page using the URL in the request. In some implementations, data stored in the memory of the card 1106 may be presented through, for example, the host device 1104 as illustrated in session 1120*h*. For example, the user may request specific information associated with a transaction on a certain data and the card 1106 may retrieve the data and present the data to the user using the host device 1104. In addition, the user may write data to the memory in the card 1106 as illustrated in session 1120*i*. For example, the user may save a picture taken by the host device on the memory in the card by writing to it In regards to session between the card 1106 and the access point, the flow 1100 illustrates the personalization session 1120*k* and the transaction session 1120*l*. In regards to personalization, a service provider may personalize a card 1106 with user credentials, user applications, Web pages, and/or other information as illustrated in session 1120*k*. For example, the wireless broadband network 1108 may transmit a provisioning request to the card 1106 including associated data. The protocol translation 1118 may translate the personalization request to a form compatible with the card 1106. In response to at least the request, the CPU 1112 transmit an indication whether the personalization was a success or not using the protocol translation 1118. Upon power on of the intelligent card, the wireless broadband network 1108 may submit a transaction challenge to the card 1106 as illustrated in session 1120*l*. In this case, the card 1106 may identify a device signature of the host device 1104, present associated data to the user through the host device 1104, and transmit the signature to the wireless broadband network 1108 using the protocol translation 1118.

Figure 12:
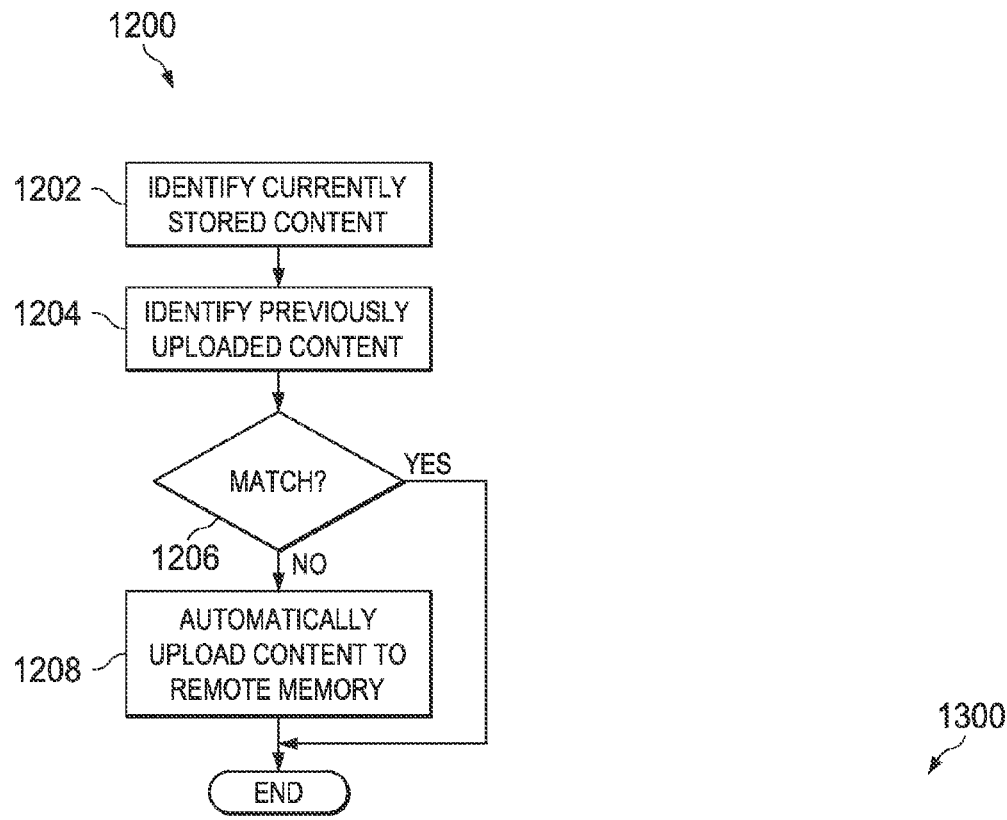
FIG. 12 is a flow chart illustrating an example method for synchronizing memory.

FIG. 12 is a flow chart illustrating an example method 1200 for synchronizing local and remote memory. In general, an intelligent card may automatically upload content from a mobile device to remote memory. Many of the steps in this flowchart may take place simultaneously and/or in different orders as shown. System 500 may use methods with additional steps, fewer steps, and/or different steps, so long as the methods remain appropriate.

Method 1200 begins at step 1202 where currently stored content is identified. At step 1204, previously uploaded content is identified. If they match at decisional step 1206, then execution ends. If they do not match, then at least a portion of the currently stored content is uploaded to the remote memory at step 1208.

Figure 13:
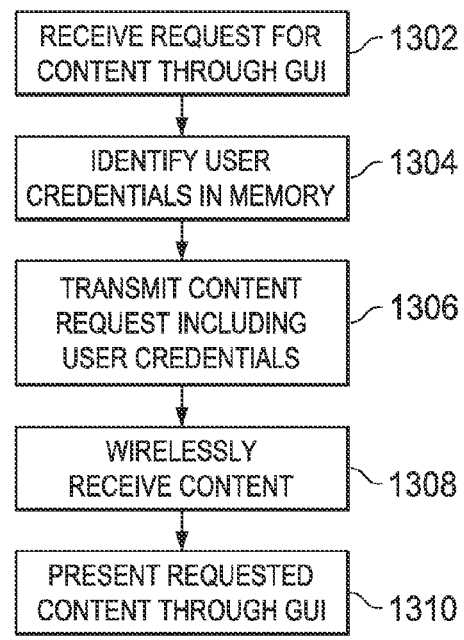
FIG. 13 is a flow chart illustrating an example method for accessing content using broadband services.

FIG. 13 is a flow chart illustrating an example method 1300 for accessing content using an intelligent card. In general, an intelligent card may transmits a content request based, at least in part, on locally-stored security information. Many of the steps in this flowchart may take place simultaneously and/or in different orders as shown. System 500 may use methods with additional steps, fewer steps, and/or different steps, so long as the methods remain appropriate.

Method 1300 beings at step 1302 where a request for content is receive through a GUI of a user device. In response to at least the request, locally-stored user credentials are identified at step 1304. A content request including the user credentials is transmitted at step 1306. At step 1308, the content is wirelessly received. The received content is presented through the GUI at step 1310.

A number of embodiments of the invention have been described. Nevertheless, it will be understood that various modifications may be made without departing from the spirit and scope of the invention. Accordingly, other embodiments are within the scope of the following claims.

What is claimed is:

1. A cover for a consumer device, comprising:
   side surfaces configured to be adjacent at least a portion one or more side surfaces of the consumer device;
   a rear surface configured to be adjacent at least a portion of a rear surface of the consumer device and connected to the side surfaces, the side surfaces and the rear surface form an opening that receives at least a portion of the consumer device, a first portion of at least one of the surfaces includes a connector for connecting to a port of the consumer device;
   the connector that includes a first interface that connects to the port of the consumer device and second interface that substantially duplicates an original port of the consumer device;
   a physical interface included in at least one of the surfaces that receives memory devices external to the consumer device;
   a circuit integrated within at least one of the surfaces and that connects the physical interface to the connector;
   a broadband service card connected to the physical interface and that accesses a foreign service through the wireless broadband network; and
   wherein the broadband card includes secure memory configured to store user credentials and one or more processors configured to execute a service application, access the foreign service using the user credentials, and wirelessly transmits a service request to a broadband service provider using the wireless broadband network.

2. The cover of claim 1, wherein the physical interface that receives an external memory device comprises a microSecureDigital (microSD) slot.

3. The cover of claim 1, the circuit further configured to convert signals between a form compatible with the broadband service card and a form compatible with the consumer device.

4. The cover of claim 3, wherein the circuit converts between a SD signal and a Universal Serial Bus (USB) signal.

5. The cover of claim 1, the consumer device comprising an iPhone.

6. The cover of claim 1, wherein one or more of the side surfaces are substantially arcuate to substantially maintain a shape and dimensions of the consumer device.

7. The cover of claim 1, the foreign service comprises access to a remote memory in a service-provider network for storing documents, files, programs, video, images or audio at least partially generated by the consumer host device.

8. The cover of claim 1, the foreign service comprises access to content distributed by the broadband service provider.

9. The cover of claim 1, further comprising the one or more processors further configured to present information associated with the service request through a Graphical User Interface (GUI) of the consumer host device.

10. The cover of claim 9, wherein the one or more processors further configured to present a request for user identification including at least one of a Personal Identification Number (PIN), user ID and password, or biometric signature through the GUI of the consumer host device, and verify the submitted user identification with user identification locally stored in the secure memory prior to accessing foreign services.

11. The cover of claim 1, wherein the one or more processors further configured to selectively switch an RF antenna between an activate state and an inactivate state in response to at least an event.

12. The cover of claim 11, wherein the switching event includes a selection through a GUI of the consumer device.

13. The cover of claim 1, wherein the broadband card wirelessly communicates using at least one of LTE, WiMAX, HSPA, HSDPA, UMB, GPRS, EDGE or other 802.1x signals.

14. The cover of claim 1, wherein the one or more processors further configured to translate signals between wireless broadband protocols and a device-interface protocol.

15. The cover of claim 1, the one or more processors further configured to:
   decrypt received signals and encrypt at least part of the service request prior to wireless transmission; and
   authenticate at least one of a cellular network of the consumer device, the wireless broadband network, the consumer device, or a user.

16. The cover of claim 15, the one or more processors further configured to deactivate the antenna in response to at least a failure to authenticate the at least one of the cellular network of the consumer device, the wireless broadband network, the consumer device, or the user.

17. The cover of claim 1, the one or more processors further configured to execute one or more authentication processes in response to at least insertion in the port of the consumer device.

18. The cover of claim 1, the one or more processors further configured to activate the broadband card and transmit to the broadband service provider a request to activate an associated user account in response to at least a user request or an initial insertion into the consumer host device.

19. The cover of claim 18, wherein the broadband card is activated based, at least in part, on a user manually entering an activation code through a GUI of the consumer device.

20. The cover of claim 1, wherein the broadband card accesses the foreign service without modifying firmware of the consumer device.

21. The cover of claim 1, wherein the broadband card emulates a customer premises equipment (CPE) when communicating with the wireless broadband network.

22. The cover of claim 1, the one or more processors further configured to receive power from the consumer device.

23. The cover of claim 1, wherein an enterprise at least associated with the broadband service provider uploads personalization data prior to activation, wherein the personalization data includes the user credentials, the service application and at least one of operational flags, a rule table or user interface.

24. The cover of claim 23, the one or more processors further configured to further update the personalization data after activation in response to at least one of a wireless signal including secure update instructions or a wired signal through a client connected to the broadband card.

* * * * *